US010054070B2

(12) United States Patent
Dudar et al.

(10) Patent No.: US 10,054,070 B2
(45) Date of Patent: Aug. 21, 2018

(54) METHODS AND SYSTEM FOR DIAGNOSING SENSORS BY UTILIZING AN EVAPORATIVE EMISSIONS SYSTEM

(71) Applicant: Ford Global Technologies, LLC, Dearborn, MI (US)

(72) Inventors: Aed M. Dudar, Canton, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 189 days.

(21) Appl. No.: 15/260,170

(22) Filed: Sep. 8, 2016

(65) Prior Publication Data

US 2018/0066595 A1 Mar. 8, 2018

(51) Int. Cl.

| | |
|---|---|
| ***F02D 41/00*** | (2006.01) |
| ***F02D 41/22*** | (2006.01) |
| ***F02D 41/18*** | (2006.01) |
| ***F02M 35/10*** | (2006.01) |

(Continued)

(52) U.S. Cl.

CPC ......... *F02D 41/0037* (2013.01); *F01N 3/023* (2013.01); *F02D 41/222* (2013.01); *F02M 35/10386* (2013.01); *F02M 35/10393* (2013.01); *F02D 41/042* (2013.01); *F02D 41/18* (2013.01); *F02D 2200/0418* (2013.01)

(58) Field of Classification Search

CPC .. F02D 41/0037; F02D 41/222; F02D 41/042; F02D 2200/0418; F02D 41/18; F01N 3/023; F02M 35/10393; F02M 35/10386

See application file for complete search history.

(56) References Cited

U.S. PATENT DOCUMENTS

| | | | | |
|---|---|---|---|---|
| 6,742,379 B2 * | 6/2004 | Matsubara | ............ | F02D 41/144 73/1.06 |
| 7,069,773 B2 | 7/2006 | Stempnik et al. | | |
| 7,131,262 B2 | 11/2006 | Sealy et al. | | |

(Continued)

FOREIGN PATENT DOCUMENTS

| | | |
|---|---|---|
| EP | 2707580 B1 | 12/2015 |

OTHER PUBLICATIONS

Dudar, Aed M., "Systems and Methods for Inferring Barometric Pressure," U.S. Appl. No. 15/211,856, filed Jul. 15, 2016, 68 pages.

*Primary Examiner* — Hung Q Nguyen
*Assistant Examiner* — Brian P Monahon
(74) *Attorney, Agent, or Firm* — Julia Voutyras; McCoy Russell LLP

(57) ABSTRACT

Methods and systems are provided for diagnosing sensors in an engine intake by utilizing in an evaporative leak check module pump (ELCM pump). In one example, during engine off conditions, the ELCM pump in an evaporative emission system of the vehicle may be operated in a pressure mode to flow ambient air from the evaporative emissions system to the intake manifold. During humidity sensor diagnostics, the air flow may be used to generate water vapors within the intake manifold, and humidity sensor may be rationalized by monitoring an output of the humidity sensor; and during MAF sensor diagnostics, MAF sensor may be rationalized by monitoring if the MAF sensor output corresponds to a flow rate generated by the ELCM.

20 Claims, 9 Drawing Sheets

(51) Int. Cl.
*F01N 3/023* (2006.01)
*F02D 41/04* (2006.01)

(56) References Cited

U.S. PATENT DOCUMENTS

| | | | | |
|---|---|---|---|---|
| 7,266,442 | B2 | 9/2007 | Ting et al. | |
| 7,311,093 | B2 * | 12/2007 | Hayashi | G01N 27/4175 123/688 |
| 7,715,976 | B1 | 5/2010 | Xiao et al. | |
| 9,224,252 | B1 * | 12/2015 | Guo | G07C 5/0808 |
| 9,382,861 | B2 | 7/2016 | Jankovic et al. | |
| 2001/0010220 | A1 * | 8/2001 | Shinjyo | F02D 41/1441 123/690 |
| 2003/0005746 | A1 * | 1/2003 | Iwazaki | G01N 27/4175 73/1.06 |
| 2003/0019212 | A1 * | 1/2003 | Baeuerle | F02D 13/0261 60/608 |
| 2005/0072411 | A1 * | 4/2005 | Cullen | F02D 41/021 123/690 |
| 2006/0282200 | A1 * | 12/2006 | Thiel | F02D 41/144 701/30.2 |
| 2009/0138154 | A1 * | 5/2009 | McLain | F02D 41/187 701/29.2 |
| 2009/0260428 | A1 * | 10/2009 | Yamashita | F02D 41/18 73/114.31 |
| 2010/0010722 | A1 * | 1/2010 | McLain | F02D 41/18 701/102 |
| 2010/0070121 | A1 * | 3/2010 | Ochiai | B60K 6/48 701/22 |
| 2010/0076635 | A1 * | 3/2010 | Sugimoto | B60K 6/445 701/22 |
| 2010/0269802 | A1 * | 10/2010 | Nakashima | F02D 41/062 123/568.21 |
| 2012/0022728 | A1 * | 1/2012 | Hall | B60L 11/123 701/19 |
| 2013/0199504 | A1 * | 8/2013 | Takeishi | F02M 25/0809 123/520 |
| 2013/0245867 | A1 * | 9/2013 | Martin | B60W 10/06 701/22 |
| 2014/0058597 | A1 * | 2/2014 | Park | F01N 11/007 701/22 |
| 2014/0238348 | A1 | 8/2014 | Pursifull et al. | |
| 2014/0238369 | A1 | 8/2014 | Jankovic et al. | |
| 2014/0238370 | A1 * | 8/2014 | Pursifull | F02D 41/005 123/690 |
| 2014/0298880 | A1 * | 10/2014 | Pursifull | G01N 33/0006 73/1.06 |
| 2015/0047603 | A1 * | 2/2015 | Surnilla | F02D 41/0007 123/350 |
| 2015/0101327 | A1 * | 4/2015 | Clark | F02D 41/0052 60/599 |
| 2015/0114361 | A1 * | 4/2015 | Matsunaga | F02M 25/0818 123/520 |
| 2015/0121864 | A1 * | 5/2015 | Surnilla | F02D 41/0052 60/605.2 |
| 2015/0275806 | A1 * | 10/2015 | Genslak | F02D 41/1401 701/104 |
| 2015/0292428 | A1 * | 10/2015 | Hakeem | F02D 41/144 701/104 |
| 2016/0097355 | A1 * | 4/2016 | Jentz | F01M 11/10 701/102 |
| 2016/0177882 | A1 * | 6/2016 | Dudar | F02D 41/0032 701/22 |
| 2016/0230681 | A1 * | 8/2016 | Tanaka | F02M 25/0836 |

* cited by examiner

METHODS AND SYSTEM FOR DIAGNOSING SENSORS BY UTILIZING AN EVAPORATIVE EMISSIONS SYSTEM

FIELD

The present description relates generally to methods and systems for diagnosing a sensor included in an intake system of an internal combustion engine.

BACKGROUND/SUMMARY

Engines may include humidity sensors for determining humidity, and mass air flow (MAF) sensors for determining a flow rate of intake air to the engine. The humidity and MAF values determined from these sensors may then be used to adjust engine operation. As one example, humidity determined from the humidity sensor may be used to adjust EGR flow to engine. Further, engines with or without EGR need an estimate of air dilution to optimally set the ignition timing, among other controls. Combustion air dilution may be determined based on humidity measurements using humidity sensors.

Further, mass air flow determined from MAF sensor may be used to estimate a cylinder air charge, which may be used to determine an amount of fuel injected into an engine cylinder for combustion during engine operation.

However, humidity and MAF sensors may degrade over time or become stuck at certain readings. As a result, engine control is degraded.

In regards to humidity sensors, one attempt to diagnose functioning of the humidity sensor in the engine intake includes comparing the output of the humidity sensor to other engine sensors positioned away from the humidity sensor. One such approach for diagnosing a humidity sensor is illustrated by Xiao et al. in U.S. Pat. No. 7,715,976. Therein, humidity sensor degradation is determined based on a comparison of an intake humidity estimated by a first humidity sensor in the intake manifold with an exhaust humidity estimated by a second humidity sensor in the exhaust manifold and an ambient humidity estimated by a third humidity sensor located outside of the engine. During conditions when all the sensor readings are expected to be substantially equal, such as during engine operating conditions in which the EGR valve is closed, if the readings of the three humidity sensors differ by more than a threshold, humidity sensor degradation may be determined. Another approach for diagnosing humidity sensor is shown by Jankovic et. al. in U.S. Pat. No. 9,382,861. Therein, humidity sensor degradation is indicated if a humidity sensor output does not correlate with an intake gas composition output. For example, if the humidity sensor detects an increase in humidity, and the intake gas compositions sensor does not detect a corresponding decrease in intake air oxygen composition, degradation of humidity sensor is indicated.

The inventors herein have identified a potential issue with such approaches for humidity sensor diagnostics. As one example, the accuracy of determining degradation of any one humidity sensor may depend on the proper functioning of the other sensors. Further, multiple humidity sensors may not be needed for engine control, and thus additional humidity sensors may not be available for comparison.

In regards to MAF sensor, one example approach for diagnosing a MAF sensor includes comparing an actual mass air flow determined based on an indication from the MAF sensor to a predicted MAF based on MAP sensor output, throttle position, and engine speed. If an error between the actual MAF and the predicted MAF is greater than a threshold, MAF sensor degradation is indicated.

However, the inventors herein have recognized potential issues with such approaches for MAF sensor diagnostics. As one example, since the diagnostics requires additional sensors, such as MAP sensor, the results depend on the proper functioning of the additional sensor. For example, drift and variability of the MAP sensor decreases the accuracy of MAF sensor diagnostics. Further, the above-mentioned process for MAF diagnostics requires that the engine be operated. Due to various engine-running noise factors, such as vibration, erratic driving conditions, hot engine temperatures, etc., diagnosing MAF during engine running conditions may further reduce the accuracy of the diagnostics. Furthermore, in vehicle systems that do not have a MAP sensor, an approach to diagnose MAF degradation is required.

In one example, the issues described above for diagnostics of intake manifold humidity and MAF sensors may be addressed by a method, comprising: during a first condition when an engine is combusting fuel, adjusting engine operation based on an output of a sensor disposed in an intake of the engine; and during a second condition when the engine is off, indicating degradation of the sensor based on an output of the sensor while flowing air from an evaporative emissions system past the sensor. In this way, degradation of sensors disposed in the engine intake may be determined without relying on additional sensors, and without the impact of engine-running noise factors.

As one example, during engine off conditions, when an engine coolant temperature stabilizes near atmospheric temperature, an evaporative level check module (ELCM) pump in an evaporative emission system of the vehicle may be operated in a pressure mode to flow ambient air from the evaporative emissions system to the intake manifold via a canister and a canister purge valve (CPV). As the intake manifold humidity sensor and the MAF sensor are disposed within the intake manifold, air is flown past the humidity and MAF sensors from the evaporative emissions system. Based on humidity (which is purposely increased during humidity sensor diagnostics as discussed below) of the air, and flow rate of the air pumped into the intake manifold, humidity, and MAF sensor degradation may be respectively diagnosed.

For example, when conditions for humidity sensor diagnosis are met (e.g., flag for humidity sensor diagnostics set and ambient humidity greater than a threshold), air pumped by the ELCM has high humidity. The humidity of the air in the evaporative emissions system may be further increased by pressurizing the air with the ELCM pump and heating the air by turning on a heating element of the canister. When pressurized and heated air is released into the intake manifold, due to the larger volume and the lower temperature of the intake manifold, the air expands and cools down. This causes water vapor in the air to condense. As a result, upon opening the CPV, humidity of the air in the intake manifold suddenly increases. If the intake manifold humidity sensor is functional, the humidity sensor output may indicate an expected increase in intake manifold humidity. If the intake manifold humidity sensor is degraded or stuck, the increase in intake manifold humidity may not be sensed by the humidity sensor, and accordingly, degradation of the humidity sensor may be indicated. In this way, by generating water vapor onboard by utilizing the ELCM pump during engine off conditions, intake manifold humidity sensor diagnostics may be performed without the use of additional sensors and without the influence of engine running noise factors.

In another example, when conditions for MAF sensor diagnostics are satisfied (e.g., flag for MAF diagnostics set), a throttle valve may be opened, and intake valves of all the cylinders may be adjusted to a closed position (no valve lift) so as to direct air flow from the evaporative emissions system into the intake manifold. After the CPV is opened, the MAF sensor may be monitored for an output that is equivalent to the calibrated flow rate of the ELCM pump. If the flow rate based on the MAF sensor output is within a threshold error limit of the ELCM flow rate, MAF sensor functionality may be confirmed. If the flow rate based on the MAF sensor output is outside the threshold error limit, MAF sensor degradation may be indicated. In this way, during engine off conditions, the MAF sensor is rationalized by reverse flow (that is, flow in a direction opposite to air flow in the intake manifold during engine operation) at a calibrated flow rate by utilizing the ELCM, thereby reducing the need for additional sensors, and reducing the influence of engine-running noise factors.

In another example, in addition to diagnostics for humidity and MAF sensors, the reverse flow generated by the ELCM may be utilized for regenerating particulate filters present in some vehicles. For example, in vehicles equipped with direct fuel injection (DI), during stratified burning operation, soot may be generated. A particulate filter may be disposed in the exhaust system to capture the soot particles. Over time, the particulate filter may become clogged with soot. Accordingly, the particulate filter may be periodically regenerated by oxidizing stored particulate matter. A regeneration reaction requires oxygen and suitable temperature conditions. One example approach for regenerating particulate filters to remove soot includes during engine combustion, commanding a lean air-fuel ratio to send excess oxygen to an electrically heated particulate to further heat the particulate filter and thereby, increase the temperature of the particulate filter. Heating the particulate filter, combined with excess oxygen, causes the soot to burn. Another example approach for generating particulate filters include spinning the engine (via a motor, for example) without combusting during deceleration fuel shut off (DFSO) in order to provide oxygen to the particulate filter. However, inventors herein have identified issues with such approaches. For example, regenerating the particulate filter by operating or spinning the engine during vehicle cold start conditions (when exhaust catalyst is below light-off temperatures) may result in increased emissions.

One example approach to address the above-mentioned issues for GPF regeneration includes during engine off conditions, utilizing the reverse flow generated by the ELCM to flow ambient air into the intake manifold, and directing the flow from the intake manifold towards the particulate filter via a cylinder (e.g. by maintaining intake and exhaust valves of the cylinder in overlapping open positions, and closing the throttle valve) in order to provide more oxygen to the particulate filter for heating and regeneration. In this way, a particulate filter may be regenerated without running or even spinning the engine. Further, by utilizing the ELCM to supply oxygen, the particulate filter may be regenerated during an electric mode of vehicle operation in hybrid vehicle systems.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
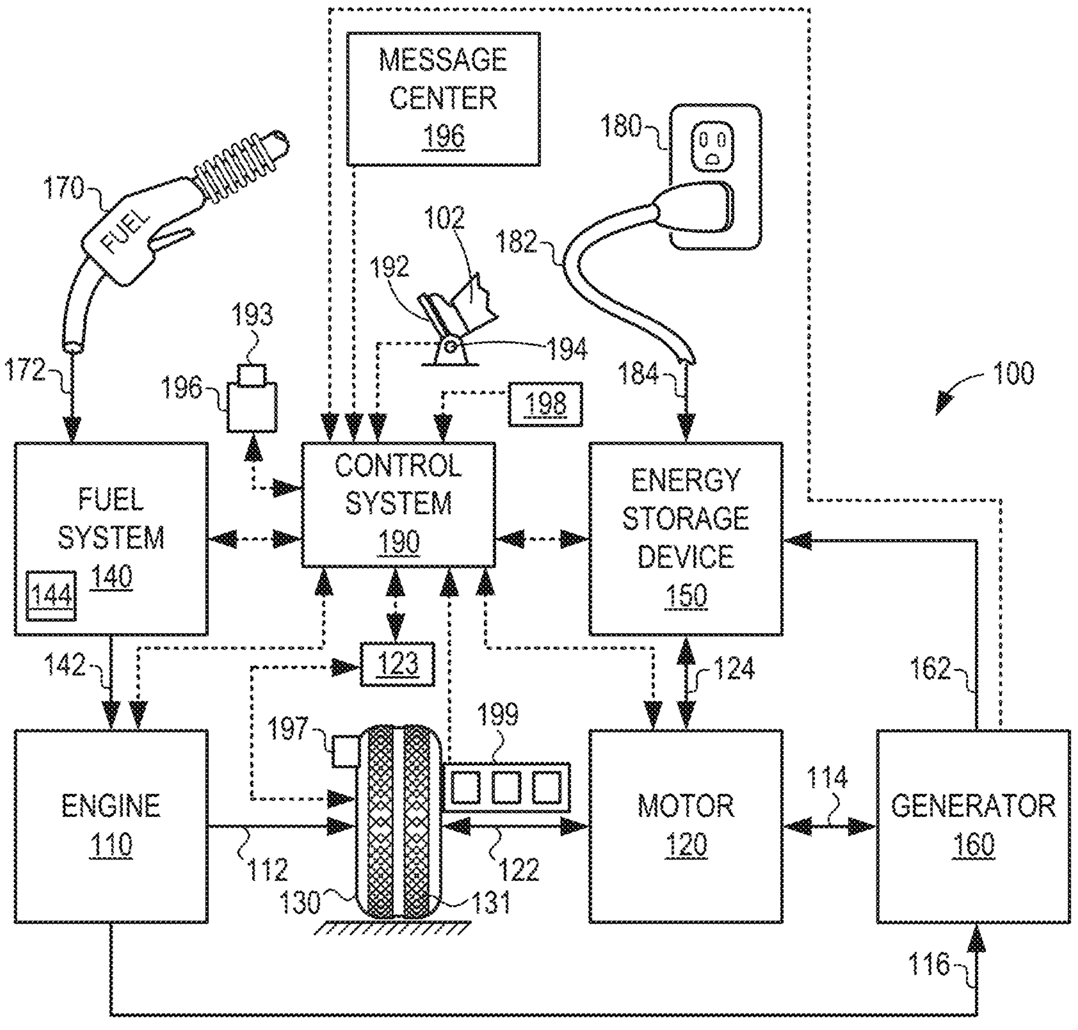
FIG. 1 schematically shows an example vehicle propulsion system.
Figure 2:
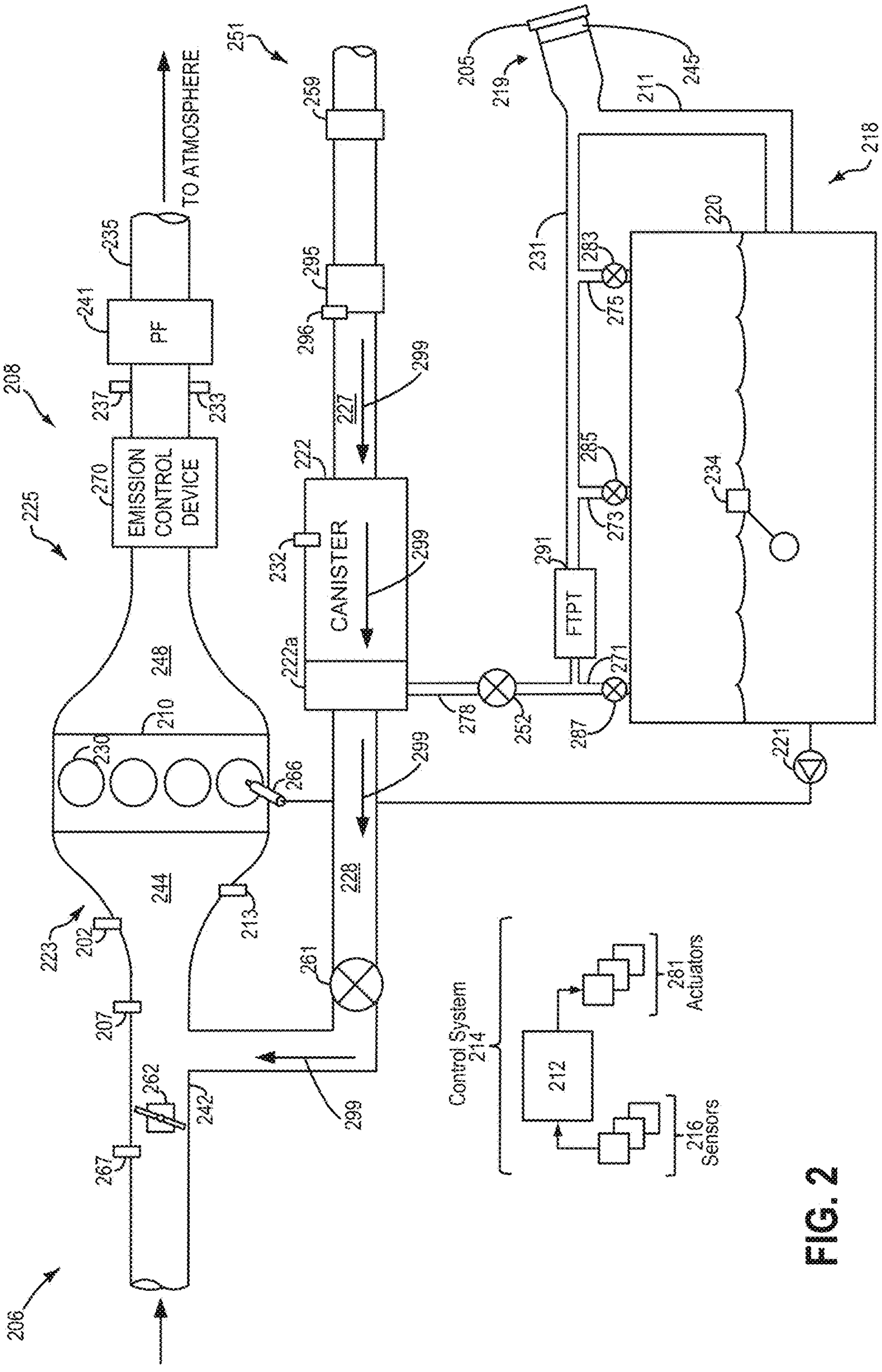
FIG. 2 schematically shows an example vehicle system with a fuel system and an evaporative emissions system.

The following description relates to systems and methods for performing one or more of intake manifold humidity sensor diagnostics, MAF sensor diagnostics, and particulate filter regeneration via the use of an evaporative level check module (ELCM). Such a rationalization procedure may be conducted on a vehicle, such as the hybrid vehicle system depicted in FIG. 1. However, while FIG. 1 depicts a hybrid vehicle system, it may be understood that the systems and methods described herein are not limited to hybrid vehicle systems. The one or more of intake manifold humidity sensor diagnostics, MAF sensor diagnostics, and particulate filter regeneration may be conducted using an ELCM pump (or other onboard pump) positioned in an evaporative emissions control system of the vehicle, where the ELCM pump is configured to pressurize or evacuate the evaporative emissions control system and fuel system, such as the evaporative emissions control system and fuel system coupled to an engine system as depicted in FIG. 2. The ELCM may include a reference orifice, such that when the pump is activated in a first direction and an ELCM changeover valve (COV) is off (e.g. first position), a vacuum may be drawn across the reference orifice in order to indicate a reference vacuum level, indicated by the ELCM configuration depicted in FIG. 3A. The reference vacuum level may be utilized for an evaporative emissions test diagnostics (e.g.

to identify leaks in the evaporative emissions system). When the ELCM pump is turned on in the first direction and the ELCM COV turned on (e.g., second position), the fuel system and evaporative emissions system may be evacuated to conduct an evaporative emissions test diagnostic, as shown by the configuration depicted in FIG. 3B. When the ELCM pump is turned off and the ELCM COV is also off (e.g., first position), a fuel vapor canister may be coupled to atmosphere, as shown by the configuration depicted in FIG. 3C. When the ELCM pump is turned on in a second direction and the ELCM COV is turned on (e.g., second position), the fuel system and evaporative emissions system may be pressurized to conduct diagnostics, such as humidity sensor diagnostics and/or MAF sensor diagnostics, as shown by the configuration depicted in FIG. 3D (also referred to herein as pressure mode). Further, during engine operating conditions when regeneration of a gasoline particulate filter (GPF) is desired, the ELCM may be operated in the pressure mode to pressurize the evaporative emissions system, as shown by the configuration depicted in FIG. 3D.

Figure 4A:
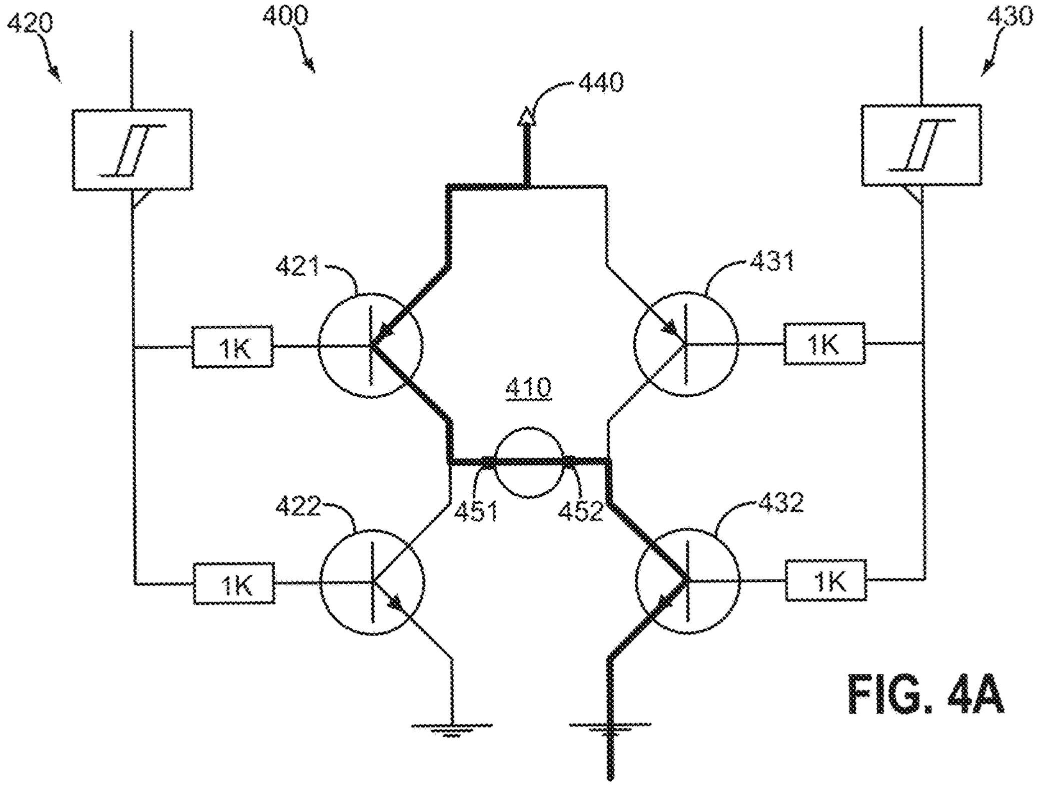
FIGS. 4A-4B show a schematic depiction of an electronic circuit configured to reverse the spin orientation of an electric motor.
Figure 4B:
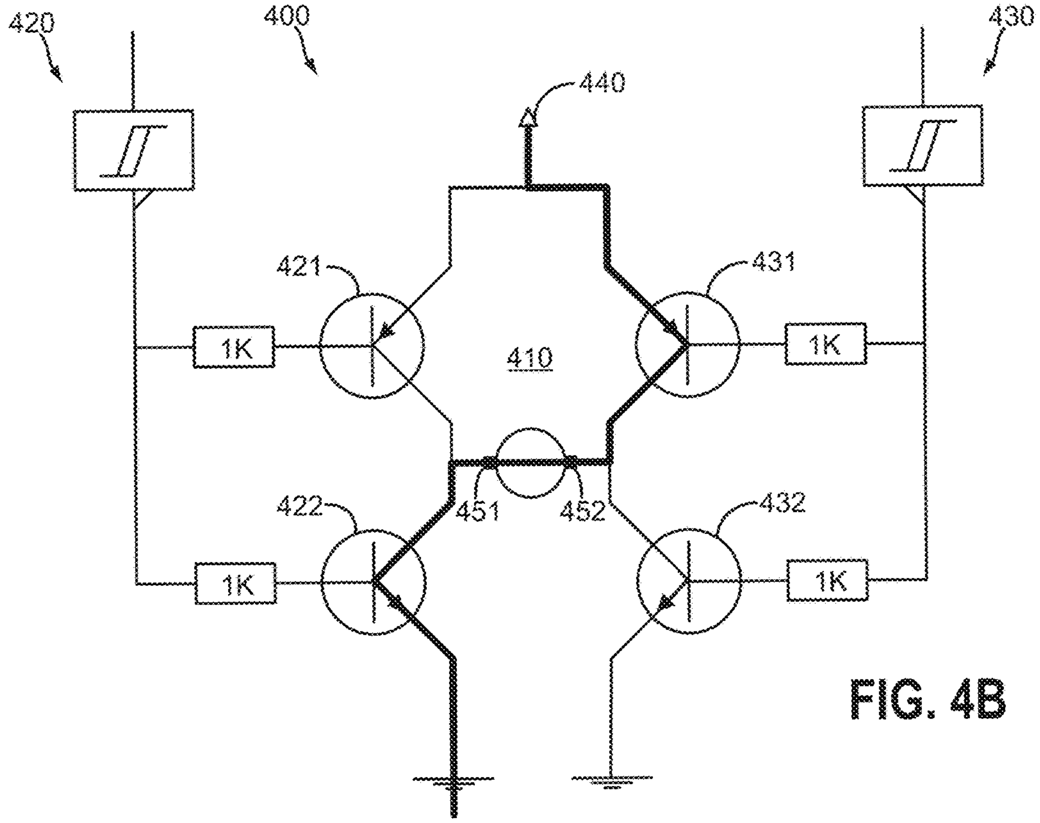

The ELCM pump may include a motor that is reversible by means of an H-bridge circuit, as shown in FIGS. 4A-4B. A controller included in a control system of the vehicle, such as control system 190 and/or control system 214, may execute instructions stored in non-transitory memory for initiating one or more of humidity sensor diagnostics, MAF sensor diagnostics, and particulate filter regeneration, according to the method of FIG. 5. Further, the controller may perform routines shown in FIGS. 6-8, to conduct humidity sensor diagnostics, MAF sensor diagnostics, and particulate filter regeneration, respectively, by using the ELCM pump during engine off conditions. A timeline for conducting one or more of humidity sensor diagnostics, MAF sensor diagnostics, and particulate filter regeneration is illustrated in FIG. 9.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

In some embodiments, motor 120 can also be operated to supply an output (power, work, torque, speed, etc.) to the drive wheels and/or engine 110 (e.g., provide a motor operation to keep engine spinning while not combusting).

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. For example, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 193 which may be manually actuated or pressed by a vehicle operator to initiate refueling. For example, as described in more detail below, in response to the vehicle operator actuating refueling button 193, a fuel tank in the vehicle may be depressurized so that refueling may be performed.

In an alternative example, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

One or more tire pressure monitoring sensors (TPMS) may be coupled to one or more tires of wheels in the vehicle. For example, FIG. 1 shows a tire pressure sensor 197 coupled to wheel 130 and configured to monitor a pressure in a tire 131 of wheel 130.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. Each cylinder of engine 210 may include one or more intake valves and one or more exhaust valves. For example, cylinder 230 may include at least one intake poppet valve (not shown) and at least one exhaust poppet valve (not shown) located at an upper region of cylinder 230. In some embodiments, each cylinder of engine 210, including cylinder 230, may include at least two intake poppet valves and at least two exhaust poppet valves located at an upper region of the cylinder.

The intake valve may be controlled by controller 212 by cam actuation via a first cam actuation system. Similarly, the exhaust valve may be controlled by controller 212 via a second cam actuation system. The first and second cam actuation systems may each include one or more cams and may utilize one or more of cam profile switching (CPS), variable cam timing (VCT), variable valve timing (VVT) and/or variable valve lift (VVL) systems that may be operated by controller 212 to vary valve operation. The position of the intake valve and the exhaust valve may be determined by an intake valve position sensor and an exhaust valve position sensor, respectively. In alternative embodiments, the intake and/or exhaust valve may be controlled by electric valve actuation. For example, cylinder 230 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

The engine 210 includes an engine intake 223 and an engine exhaust 225. The engine intake 223 includes a throttle 262 fluidly coupled to the engine intake manifold 244 via an intake passage 242. Engine intake may further include various sensors. For example, a mass air flow (MAF) sensor 202 may be coupled to the engine intake to determine a rate of air mass flowing through the intake. For example, an output of the MAF sensor 202 may be used to determine a mass air flow through the intake, which may be used to estimate a cylinder air charge. Based on the cylinder air charge, a fuel injection amount may be determined.

Further, an intake manifold humidity sensor 207 may be coupled to the intake 244 to indicate a humidity of intake air. The intake manifold humidity sensor 207 may be positioned downstream of the throttle valve. The humidity sensor 207 may measure the relative humidity and temperature of the gas that the sensor is exposed to. Based on the relative humidity and temperature, the specific humidity of the gas may be determined (e.g., the amount of water per unit mass of gas flow). To measure the relative humidity, a dew point sensor (using a chilled mirror, for example) or a wet bulb or dry bulb sensor may be used. In other examples, the absolute humidity may be measured by a capacitance sensor, and the temperature and/or pressure of the air estimated or measured in order to calculate the relative and/or specific humidity.

Output from humidity sensor 207 may be used to adjust one or more engine operating parameters, such as the amount of exhaust gas recirculation directed to the engine. For example, exhaust gas recirculation (EGR) lowers the oxygen content of the cylinder charge, which may lead to combustion stability issues. If humidity is high, combustion issues may be further exacerbated, and thus EGR levels may be controlled based on intake air humidity. Other parameters that may be adjusted based on humidity include spark timing, air-fuel ratio, and other parameters.

Overtime sensors, such as MAF sensor 202 and humidity sensor 207, may degrade or be stuck. Thus, MAF sensors, and humidity sensors may be periodically diagnosed for degradation. As discussed in detail herein, MAF and/or humidity sensor diagnostics may be performed during engine-off condition. As one example, during engine off conditions, when an engine coolant temperature stabilizes near atmospheric temperature, an evaporative level check module (ELCM) pump in an evaporative emission system of the vehicle may be operated in a pressure mode to flow ambient air from the evaporative emissions system to the intake manifold via a canister and a canister purge valve (CPV). As the intake manifold humidity sensor and the MAF sensor are disposed within the intake manifold, air is flown past the humidity and MAF sensors from the evaporative emissions system. Based on humidity (which is purposely increased during humidity sensor diagnostics as discussed below) of the air, and flow rate of the air pumped into the intake manifold, humidity, and MAF sensor degradation may be respectively diagnosed. Details of MAF and/or intake humidity sensor diagnostics will be further elaborated with respect to FIGS. 5, 6, 7, and 9 below.

A barometric pressure sensor 213 may be included in the engine intake. For example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP. Other sensors, such as intake manifold temperature sensor (not shown) for estimating a manifold air temperature, may be included in the engine intake.

The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. Further, a particulate filter (PF) 241 may be included in the exhaust passage 235 downstream of the emission control device 270 in the direction of exhaust flow. While the present example shows particulate filter 241 downstream of the emission control device 270, embodiments where the PF 241 is upstream of the emission control device 270 is also within scope of the disclosure. In one example, PF 241 may be configured as a gasoline particulate filter (GPF). GPF retains residual soot and other hydrocarbons exhausted from engine 210 in order to lower emissions. The retained particulates may be oxidized to produce CO2 in a forced regeneration process that is performed during engine operation. The GPF regeneration process may be performed to reduce the soot load retained in the GPF. GPF regeneration may be performed at high GPF temperatures (e.g., 600° C. and above) so that the retained particulates are combusted in a quick manner and are not released to the atmosphere.

In one embodiment, as discussed herein, GPF regeneration may be performed during engine-off conditions by utilizing an ELCM pump disposed in the exhaust. For example, in order to increase GPF temperature, air may be pumped by the ELCM pump into the intake manifold and delivered to the exhaust passage where the GPF is located. By introducing air through the GPF, a temperature of the GPF may be increased. Further, the oxygen present in the air may facilitate combustion of the soot particles trapped by the GPF. Details of performing GPF regeneration will be further elaborated with respect to FIGS. 5, 8, and 9 below.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer **222*a* (or buffer region), each of the canister and the buffer comprising the adsorbent. As shown, the volume of buffer 222*a* may be smaller than (e.g., a fraction of) the volume of canister 222. The adsorbent in the buffer 222*a* may be same as, or different from, the adsorbent in the canister (e.g., both may include charcoal). Buffer 222*a* may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222**. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, when one or more of an intake manifold humidity sensor diagnostic, a MAF sensor diagnostic, and GPF regeneration is performed, an ELCM pump (discussed below) may pump air from the evaporative emissions system into the intake manifold via the canister 222, purge valve 261, and purge line 228.

In some examples, the flow of air and vapors between canister 222 and the atmosphere may be regulated by a canister vent valve coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, MAF sensor 202, MAP sensor 213, and canister temperature sensor 232. Other sensors such as pressure, temperature, air/fuel ratio, and composition sensors may be coupled to various locations in the vehicle system 206. As another example, the actuators may include fuel injector 266, throttle 262, fuel tank isolation valve 253, pump 292, and refueling lock 245. The control system 214 may include a controller 212. The controller may receive input data from the various sensors, process the input data, and trigger the actuators in response to the processed input data based on instruction or code programmed therein corresponding to one or more routines. Example control routines are described herein with regard to FIGS. 5-8.

Evaporative emissions test diagnostic routines may be intermittently performed by controller 212 on fuel system 218 and evaporative emissions control system 251 to confirm the presence or absence of undesired evaporative emissions. As such, evaporative emissions test diagnostic routines may be performed while the engine is off (engine-off test) using engine-off natural vacuum (EONV) generated due to a change in temperature and pressure at the fuel tank following engine shutdown and/or with vacuum supplemented from a vacuum pump. Alternatively, evaporative emissions test diagnostic routines may be performed while the engine is running by operating a vacuum pump and/or using engine intake manifold vacuum. Evaporative emissions test diagnostics may be performed by an evaporative level check module (ELCM) 295 communicatively coupled to controller 212. ELCM 295 may be coupled in vent 227, between canister 222 and the atmosphere. ELCM 295 may include a vacuum pump for applying negative pressure to the fuel system when administering an evaporative emissions test. In some embodiments, the vacuum pump may be configured to be reversible. In other words, the vacuum pump may be configured to apply either a negative pressure or a positive pressure on the evaporative emissions system 251 and fuel system 218. ELCM 295 may further include a reference orifice and a pressure sensor 296. A reference check may thus be performed whereby a vacuum may be drawn across the reference orifice, where the resulting vacuum level comprises a vacuum level indicative of an absence of undesired evaporative emissions. For example, following the reference check, the fuel system 218 and evaporative emissions system 251 may be evacuated by the ELCM vacuum pump. In the absence of undesired evaporative emissions, the vacuum may pull down to the reference check vacuum level. Alternatively, in the presence of undesired evaporative emissions, the vacuum may not pull down to the reference check vacuum level.

As will be discussed in further detail below with respect FIGS. 5-9, in addition to being utilized for conducting an evaporative emissions test diagnostic procedure, the ELCM may be used to perform one or more of an intake manifold humidity sensor diagnostic, a MAF sensor diagnostic, and GPF regeneration. Specifically, the ELCM may be used to perform one or more of an intake manifold humidity sensor diagnostic, a MAF sensor diagnostic, and GPF regeneration during engine off conditions. Briefly, during engine off conditions, the ELCM may be operated in a configuration, as discussed below with respect to FIG. 3D, to pump air from the atmosphere into the intake manifold when it is desired to perform one or more of an intake manifold humidity sensor diagnostic, a MAF sensor diagnostic, and GPF regeneration. Direction of flow of air from the evaporative emissions system to the intake manifold during engine off conditions when an intake manifold humidity sensor diagnostic, a MAF sensor diagnostic, or GPF regeneration is performed is shown by solid arrow 299.

Figures 3A, 3B, 3C, 3D:
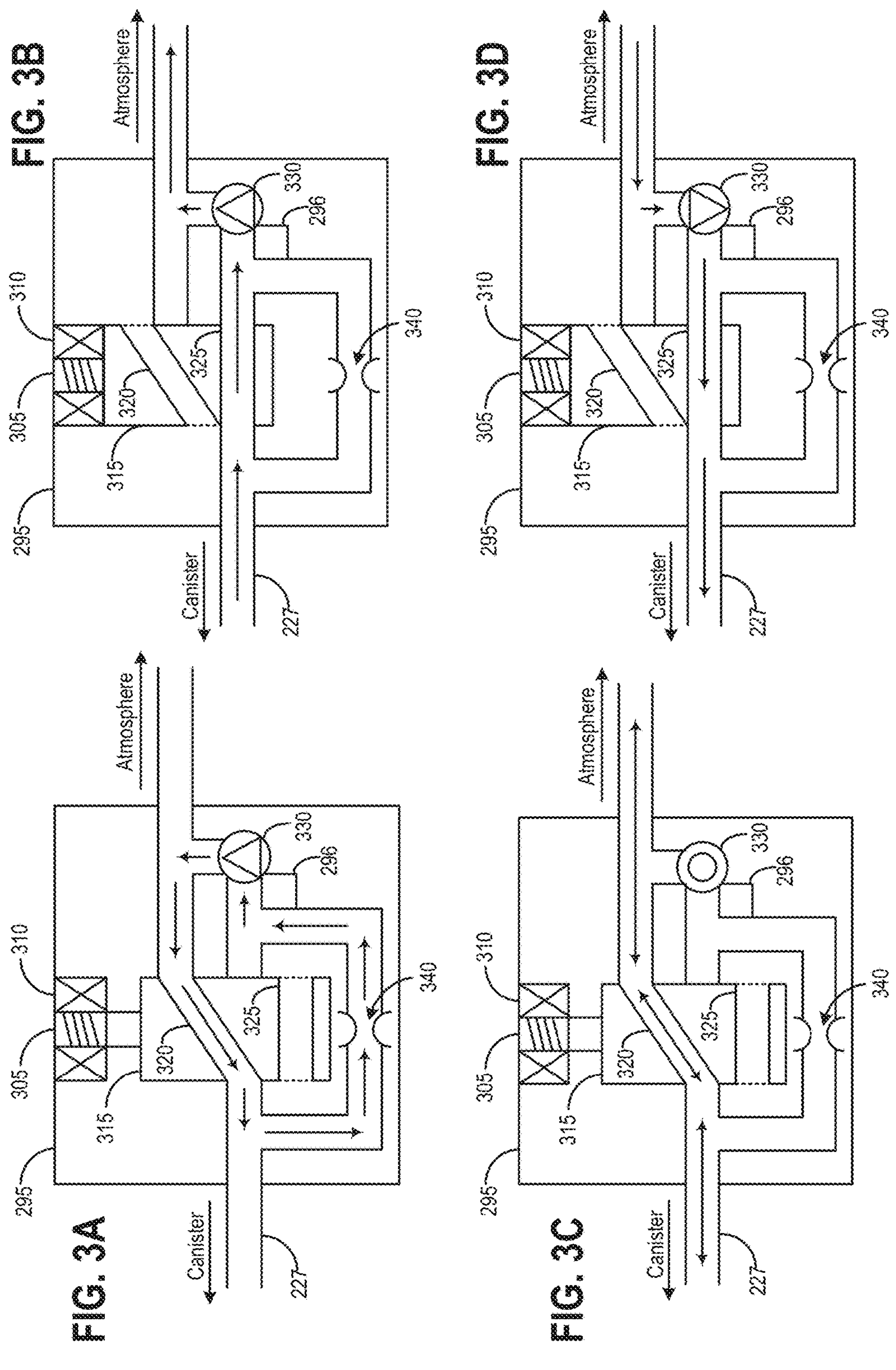
FIG. 3A shows a schematic depiction of an evaporative level check module (ELCM) in a configuration to perform a reference check.
FIG. 3B shows a schematic depiction of an ELCM in a configuration to evacuate a fuel system and evaporative emissions system.
FIG. 3C shows a schematic depiction of an ELCM in a configuration that couples a fuel vapor canister to atmosphere.
FIG. 3D shows a schematic depiction of an ELCM in a configuration to pressurize a fuel system and evaporative emissions system.

FIGS. 3A-3D show a schematic depiction of an example ELCM 295 in various conditions in accordance with the present disclosure. As shown in FIG. 2, ELCM 295 may be located along vent 227 between canister 222 and atmosphere. ELCM 295 includes a changeover valve (COV) 315, a pump 330, and a pressure sensor 296. Pump 330 may be a reversible pump, for example, a vane pump. COV 315 may be moveable between a first a second position. In the first position, as shown in FIGS. 3A and 3C, air may flow through ELCM 295 via first flow path 320. In the second position, as shown in FIGS. 3B and 3D, air may flow through ELCM 295 via second flow path 325. The position of COV 315 may be controlled by solenoid 310 via compression spring 305. ELCM 295 may also comprise reference orifice 340. Reference orifice 340 may have a diameter corresponding to the size of a threshold for undesired evaporative emissions to be tested, for example, 0.02". In either the first or second position, pressure sensor 296 may generate a pressure signal reflecting the pressure within ELCM 295. Operation of pump 330 and solenoid 310 may be controlled via signals received from controller 212.

As shown in FIG. 3A, COV 315 is in the first position, and pump 330 is activated in a first direction. Air flow through ELCM 295 in this configuration is represented by arrows. In this configuration, pump 330 may draw a vacuum on reference orifice 340, and pressure sensor 296 may record the vacuum level within ELCM 295. This reference check vacuum level reading may then become the threshold for the presence or absence of undesired evaporative emissions in a subsequent evaporative emissions test diagnostic.

As shown in FIG. 3B, COV 315 is in the second position, and pump 330 is activated in the first direction. This configuration allows pump 330 to draw a vacuum on fuel system 218 and evaporative emissions system 251. In examples where fuel system 218 includes FTIV 252, FTIV 252 may be opened to allow pump 330 to draw a vacuum on fuel tank 220. Air flow through ELCM 295 in this configuration is represented by arrows. In this configuration, as pump 330 pulls a vacuum on fuel system 218, the absence of undesired evaporative emissions in the system should allow for the vacuum level in ELCM 295 to reach or exceed the previously determined reference vacuum threshold. In the presence of undesired evaporative emissions larger than the reference orifice, the pump will not pull down to the reference check vacuum level.

As shown in FIG. 3C, COV 315 is in the first position, and pump 330 is de-activated. This configuration allows for air to freely flow between atmosphere and the canister. This configuration may be used during a canister purging operation, for example, and may additionally be used during vehicle operation when a purging operation is not being conducted, and when the vehicle is not in operation.

As shown in FIG. 3D, COV 315 is in the second position, and pump 330 is activated in a second direction, opposite from the first direction. For example, pump 330 may be activated in a reverse direction by operating H-bridge circuit as discussed in FIG. 4B below. In this configuration, pump 330 may pull air from atmosphere into fuel system 218 and evaporative emission system 251. In a configuration where FTIV 252 is open and CPV 261 is closed, air drawn by pump 330 may promote desorption of fuel vapor from canister 222, and further direct the desorbed fuel vapor into fuel tank 220. In this way, fuel vapor may be purged from the canister to the fuel tank, thereby decreasing the potential for bleed emissions.

During conditions when one or more of intake manifold humidity sensor diagnostic, MAF sensor diagnostics, and GPF regeneration is performed, the ELCM may be operated in the configuration shown in FIG. 3D to pump air from the atmosphere to the evaporative emissions system. When ELCM pump is used for the above-mentioned operations, the FTIV 252 is in a closed position. Therefore, air and/or fuel vapors do not flow into the fuel tank, and air pumped by the ELCM is directed to the intake manifold via canister 222, CPV 261, and purge line 268.

In summary, drawing a vacuum across the reference orifice of fixed diameter includes configuring the change-over valve coupled to the vacuum pump in a first position (an OFF configuration), and pressurizing or evacuating the vehicle fuel system and evaporative emissions control system includes configuring the changeover valve in a second position (on ON configuration).

FIGS. 4A and 4B show an example circuit 400 that may be used for reversing pump motor of ELCM 295. Circuit 400 schematically depicts an H-Bridge circuit that may be used to run a motor 410 in a first (forward) direction and alternately in a second (reverse) direction. Circuit 400 comprises a first (LO) side 420 and a second (HI) side 430. Side 420 includes transistors 421 and 422, while side 430 includes transistors 431 and 432. Circuit 400 further includes a power source 440.

In FIG. 4A, transistors 421 and 432 are activated, while transistors 422 and 431 are off. In this confirmation, the left lead 451 of motor 410 is connected to power source 440, and the right lead 452 of motor 410 is connected to ground. In this way, motor 400 may run in a forward direction (vacuum mode of ELCM).

In FIG. 4B, transistors 422 and 431 are activated, while transistors 421 and 432 are off. In this confirmation, the right lead 452 of motor 410 is connected to power source 440, and the left lead 451 of motor 410 is connected to ground. In this way, motor 400 may run in a reverse direction (pressure mode of ELCM).

Figure 5:
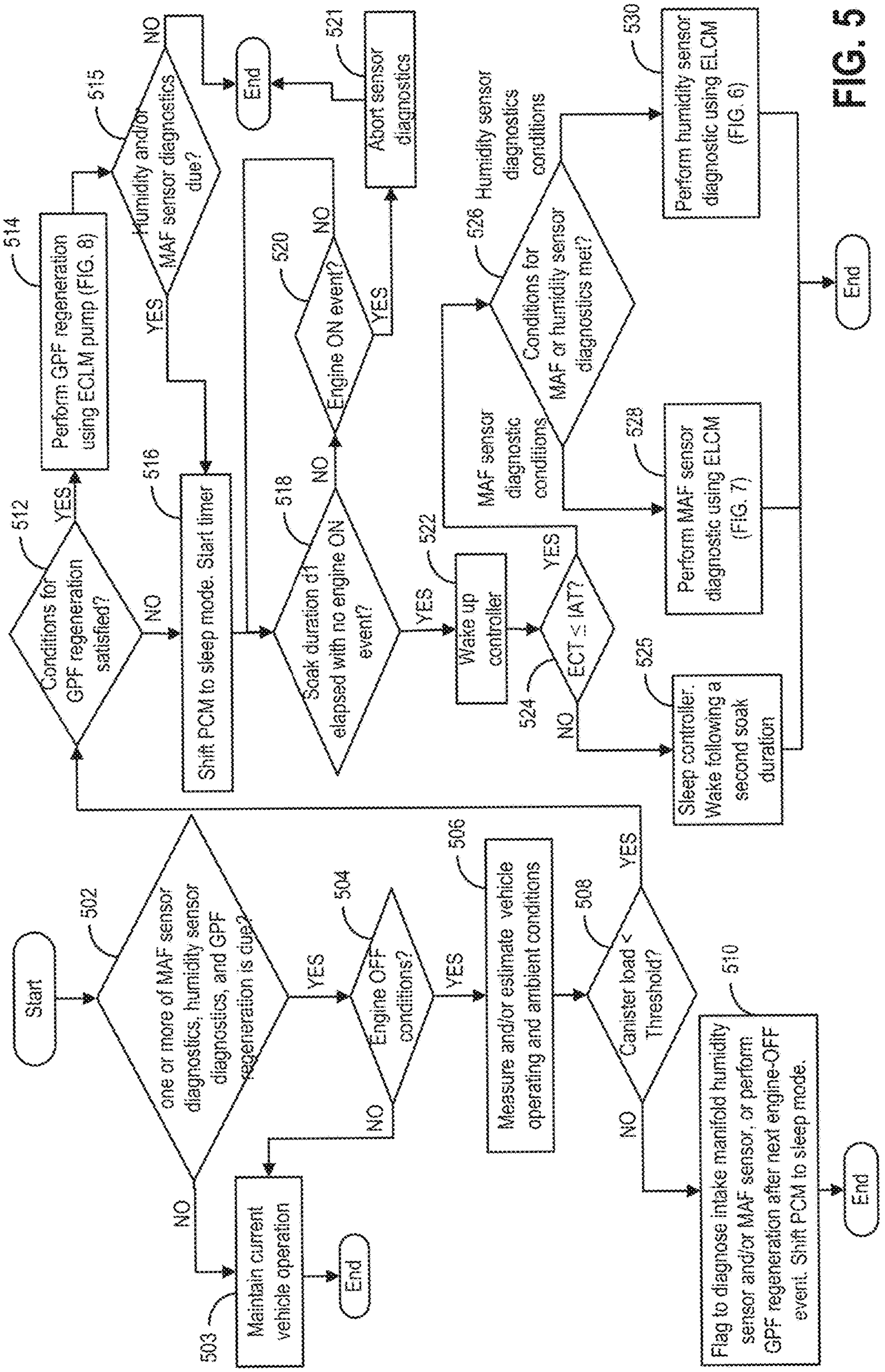
FIG. 5 shows a flow chart for initiating one or more of intake manifold humidity sensor diagnostics, MAF sensor diagnostics, and particulate filter regeneration, based on engine operating conditions.

FIG. 5 shows a flow chart illustrating an example method 500 for initiating one or more of a humidity sensor diagnostic, a MAF sensor diagnostic, or a particulate filter regeneration, using ELCM pump. Instructions for carrying out method 500 and other methods included herein may be executed by a controller of the vehicle system, such as controller 12 at FIGS. 1-3D, based on instructions stored in non-transitory memory of the controller, and in conjunction with signals received from sensors of the vehicle system, such as the sensors described above with reference to FIGS. 1-3D. The controller may employ actuators of the vehicle system, such as the actuators described with reference to FIGS. 1-3D, to perform one or more of humidity sensor diagnostic, MAF sensor diagnostic, or particulate filter regeneration, according to the methods described below. For example, during a first condition, when conditions for humidity sensor diagnostics are met, the ELCM pump may be operated to perform humidity sensor diagnostics; during a second condition, when conditions for MAF sensor diagnostics are met, the ELCM pump may be operated to perform MAF sensor diagnostics; and during a third condition, when conditions for particulate filter regeneration are met, the ELCM pump may be operated to perform particulate filter regeneration. Further, one or more of humidity sensor diagnostics, MAF sensor diagnostics, and particulate filter regeneration may be performed during engine-off conditions. Further, method 500 may be performed when it is confirmed that the evaporative emissions system is intact (without any leak). Accordingly, method 500 may be performed within a threshold period (e.g., a threshold number of miles) after the engine has passed an evaporative emissions leak test. If leaks are present in the evaporative emissions and/or if the ELCM pump is not fully functional, method 500 may not be performed.

Method 500 begins at 502. At 502, method 500 includes judging if one or more of humidity sensor diagnostics, MAF sensor diagnostics, and particulate filter regeneration, are to be performed. For example, humidity sensors may be tested for potential faults periodically. Accordingly, the controller may determine that intake manifold humidity sensor diagnostics is due to be performed if a threshold duration has elapsed after a previous diagnostic test of the humidity sensor. As an example, the threshold duration may be based on a driving distance since previous test of the humidity sensor. The controller may monitor a number of miles driven since the humidity sensor was last diagnosed, and if a threshold number of miles have elapsed since the last diagnostics, the controller may set a flag to diagnose the humidity sensor at next engine-off event. Thus, judging if humidity sensor diagnostics is due to be performed may include determining if the flag for humidity sensor diagnostics is set.

Similarly, the MAF sensor may be diagnosed for faults periodically. Accordingly, when a threshold duration has elapsed after a previous diagnostic test of the MAF sensor, a flag for testing MAF sensor performance may be set. In another example, the flag for testing MAF sensor may be set, when a diagnostic trouble code pertaining to MAF performance is set. For example, during engine operation, the controller may compare an actual MAF sensor output to a predicted mass air flow (the predicted mass air flow based on MAP sensor output, throttle position, and engine speed). Responsive to a difference between the actual MAF sensor output and predicted MAF greater than a threshold difference, the controller may set a DTC code, such as DTC code P0101. Responsive to the DTC code for MAF performance being set, the controller may set a flag to diagnose MAF sensor during next engine OFF event. Thus, judging if MAF sensor diagnostics is due to be performed may include determining if the flag for MAF sensor diagnostics is set, wherein flag for MAF sensor may be set responsive to one or more of a threshold duration elapsing after a previous MAF diagnostic test, and a DTC code for MAF sensor being set.

Further, the controller may judge that the particulate filter regeneration is due to be performed when a soot load of the particulate filter increases above a threshold load. For example, a particulate filter soot sensor may indicate a soot load of the particulate filter to the controller. Responsive to the soot load increasing above the threshold load, the controller may set a flag to regenerate particulate filter after next engine OFF event.

If the answer at 502 is YES, then method 500 proceeds to 504. At 504, method 500 includes judging if engine-off conditions are present. Engine-off conditions may include any vehicle conditions where the engine is not in operation. In some examples, engine-off conditions may be based on a vehicle operator input, e.g., a vehicle operator may press an engine-off button to initiate engine-off conditions. As another example, a hybrid electric vehicle may transition from engine-on conditions, where the vehicle is propelled by engine operation (by combustion) to engine-off conditions, where the engine is off (not combusting) but the vehicle is propelled via an auxiliary power source (e.g., motor). In some examples, engine-off conditions may be one-to-one equivalent of vehicle-off conditions. In such cases, engine-off conditions may include one or more of key-off condition, a stop-button actuated condition, or a passive key outside a threshold range, depending of the configuration of the vehicle.

If the answer at 504 is YES, the engine is not operating. Accordingly, method 500 proceeds to 506. At 506, method 500 includes estimating and/or measuring vehicle operating condition and ambient conditions. For example, vehicle operating conditions and the ambient condition may be estimated and/or measured based on indications from one or more sensors, such as sensors described with respect to FIGS. 1-3D. The vehicle operating conditions may include engine operating conditions, and fuel system operating condition, which may include evaporative emissions system operating conditions, for example. The vehicle and ambient conditions may be measured (e.g., using on-board sensors), estimated, and/or inferred. The operating conditions may include vehicle conditions, such as vehicle speed, vehicle location, vehicle occupancy, vehicle operating status (e.g. on or off), soak duration after vehicle off event (when vehicle is off), etc.; engine conditions, such as engine operation status (e.g. on or off), engine speed, engine load, duration of engine operation (e.g., duration of engine ON or OFF), intake manifold temperature, engine coolant temperature, etc.; fuel system conditions, such as fuel level, fuel tank pressure, canister load, ELCM pump operating status, etc., ambient conditions, such as ambient temperature, barometric pressure, ambient humidity, etc.; as well as other conditions.

Upon measuring and/or estimating vehicle operating conditions and ambient conditions, method 500 proceeds to 508. At 508, method 500 includes judging if a canister load is less than a threshold. For example, in order to reduce evaporative emissions, sensor diagnostics and/or particulate filter regeneration may be performed when the canister load (that is, the amount of fuel vapors stored in the canister) is less than the threshold load. The canister load may be measured, estimated, or inferred. For example, the canister load may be determined based on canister temperature change during a fuel tank venting event and/or a refueling event. In some examples, canister loading may be determined based on fuel composition, fuel RVP, fuel tank pressure, a quantity of fuel added during a refueling event, etc. In some other examples, the canister load may be estimated based on, for example, pressure differences across the canister, an air/fuel ratio estimated downstream of the canister, and/or based on fuel vapor concentrations learned on an immediately previous canister loading and/or purging operation. In still further examples, one or more oxygen sensors may be coupled to the canister (e.g., downstream of the canister), or positioned in the engine intake and/or engine exhaust, to provide an estimate of the canister load. Thus, canister load may be determined prior to engine shut-down. The canister load threshold may be predetermined and/or based on operating conditions. The canister load threshold may represent a canister load, which is not expected to generate undesired evaporative emissions over the course of method 500.

If the canister load is above the threshold, method 500 proceeds to 510. At 510, method 500 includes setting a flag to follow up diagnosis of intake manifold humidity sensor and/or MAF sensor, or perform particulate filter regeneration after a next engine-off event. For example, a code may be stored at a controller that may trigger re-initiation of method 500 following a next engine-off event. The controller may then be shifted to sleep mode without performing one or more of humidity sensor diagnostics, MAF sensor diagnostics, or particulate filter regeneration during the current engine-off conditions. However, the engine operation may be initiated after the current engine-off duration. During the engine operation, when the controller determines that the canister load is greater than a higher threshold load, a canister purge operation may be performed, wherein the fuel vapors stored in the canister are purged into the intake manifold via the purge valve, and combusted during engine operation. Responsive the to the canister purge operation, the canister load may decrease below the threshold. While the canister load remains below the threshold, if the engine is turned off, the controller, upon determining that the flag to follow-up is set, may reinitiate method 500. Method 500 may then end.

If the answer at 508 is YES, method 500 proceeds to 512. At 512, method 500 includes determining if conditions for particulate filter regeneration are satisfied. Conditions for particulate filter regeneration may include a flag for particulate filter regeneration, wherein the flag for particulate filter regeneration may be set during vehicle operation prior to engine shut-down. The flag for particulate filter regeneration may be set based on one or more of an amount of particulate matter (i.e., soot and/or ash) accumulated in the PF, an oxidation rate of the particulate matter stored in the PF, and a duration of engine operation after a previous particulate filter regeneration. For example, the amount of PM accumulated in the PF may be determined by measuring (e.g., via a pressure sensor in the exhaust system, by measuring the pressure differential across the PF) or inferring the backpressure caused by the PF, with the measured or inferred backpressure used to access a data structure or transfer function that yields an accumulated PF amount corresponding to the backpressure. The oxidation rate of PM stored in the PF may be determined by accessing a data structure storing oxidation rates of PM that are indexed by temperature and mass flow rate of oxygen, for example, where the temperature may be sensed via temperature sensor coupled to the particulate filter, and the mass flow rate of oxygen may be sensed based on a difference between readings from exhaust oxygen sensors positioned immediately upstream and downstream the particulate filter in the exhaust. In another example, a soot accumulation model that estimates the amount of soot produced by an engine may be the basis for regenerating a particulate filter. If the estimated amount of soot exceeds a soot threshold, flag for particulate filter regeneration may be set. As yet another example, particulate filter regeneration may be determined based on signals received from a soot sensor positioned downstream of the particulate filter.

If conditions for particulate filter regeneration are satisfied, method 500 proceeds to 514. At 514, method 500 includes performing particulate filter regeneration by employing ELCM pump. Details of performing particulate filter regeneration during engine-off conditions by using ELCM pump will be described with respect to FIG. 8. Briefly, an electric motor (e.g., motor 120) may be turned on via a high-voltage battery. The motor may be operated at a low speed to spin the engine briefly (e.g., one or two revolutions) such that an intake valve and an exhaust valve of a first cylinder are at overlapping open positions. The first cylinder may then be maintained with the intake and exhaust valve in overlapping open positions. In this way, a path may be provided for oxygen to travel towards the particulate filter via the first cylinder. Next, a particulate filter heater may be turned ON, and the throttle may be commanded to a closed position. After a threshold duration has passed that allows the particulate filter to heat to a threshold temperature, the ELCM pump may be operated in a pressure mode, and the canister purge valve may be opened. As a result, the ELCM may pump air into the intake manifold via the canister. Due to overlapping open positions of the intake and exhaust valves of the first cylinder, and closed throttle, air flow may be directed from the intake manifold to the exhaust manifold and the particulate filter via the first cylinder. As the air includes oxygen, air flow through the particulate filter allows oxygen to pass through the particulate filter, which substantially increases the particulate filter temperature, and aids in oxidation of soot. As a result, the particulate matter accumulated in the particulate filter is oxidized (burned), thereby regenerating the particulate filter.

Upon regenerating the particulate filter, method 500 proceeds to 515. At 515, method 500 includes determining if one or more of MAF and humidity sensor diagnostics are due to be performed. For example, the controller may determine if one or more flags for MAF and/or humidity sensor diagnostics are set. If yes, method 500 proceeds to 516; otherwise, method 500 may end.

Returning to 512, if conditions for particulate filter regeneration are not satisfied, method 500 proceeds to 516. At 516, method 500 includes shifting the controller of the engine system (such as engine controller 212) to a sleep mode to reduce engine-off energy consumption by on-board sensors, auxiliary components, and diagnostics. In addition, a timer may be started.

Next, at 518, method 500 includes determining if a soak duration d1 has elapsed since the engine was shut down with no engine-on event. For example, the controller may determine whether a current engine-off duration is equal to or greater than time duration d1. The current engine-off duration may be a duration that has elapsed since the engine was turned off. The current engine-off duration may be monitored via a timer that may be started responsive to an engine-off event. The duration d1 may be sufficiently long (such as a few hours) to allow stabilization of engine temperature to ambient conditions. Temperature stabilization reduces the effect of temperature as noise during MAF and/or humidity sensor diagnostics.

Further, at 518, it may be determined that during the duration d1, the vehicle has been in engine-off condition with no engine-on event. Herein, the engine-on event may be either an operator induced engine-on event or an automatic engine-on which includes events wherein the engine is turned on automatically, and without input from a vehicle operator. As an example, in vehicles configured with idle start/stop systems, the automatic engine-on event may include an automatic engine restart from idle-stop in response to engine operating parameters falling outside a threshold range. For example, the engine may be automatically started by the vehicle controller in response to a battery state of charge falling below a threshold or in response to an air pressure in a compressor falling below a threshold. Accordingly, if vehicle has not been in engine-off conditions during the duration d1, method 500 proceeds to 520. At 520, method 500 includes determining if an engine-on event has occurred. If yes, then method 500 proceeds to 521. At 521, method 500 includes, in response to the engine-on event, activating a fuel pump to fuel the engine and, aborting MAF and/or humidity sensor diagnostic. MAF and/or humidity sensor diagnostics may be reattempted during a subsequent engine-off condition. If the answer at 520 is NO, method 500 returns to 518.

Returning to 518, upon confirming that the duration d1 has elapsed without an engine-on event, method 500 proceeds to 522. At 522, method 500 includes waking the controller. Specifically, at 522, the controller may be shifted from a sleep mode to a wake-up mode.

Next, at 524, method 500 includes determining whether an engine coolant temperature is within a threshold of an intake air temperature. In this way, it may be determined whether the engine has sufficiently cooled to ambient temperature. Engine coolant temperature may be measured by one or more engine coolant temperature sensors, such as a thermostatic sensor, while intake air temperature may be measured by one or more intake air temperature sensors mounted in an intake passage of the engine, such as IAT 267. In some examples, alternatively, the engine coolant temperature may be compared to an ambient temperature in lieu of intake air temperature. The ambient temperature may be determined based on an indication from an ambient air temperature (AAT) sensor coupled to the exterior of vehicle. The ambient air temperature sensor may be coupled to a front grill of the vehicle, for example. If the engine coolant temperature is more than a threshold away from the intake air temperature, method 500 proceeds to 525, and includes sleeping the controller (or placing the controller in a low-power mode), and re-waking the controller following a second engine-off soak duration.

When the engine coolant temperature is within a threshold of the intake air temperature, method 500 may proceed to 526. At 526, method 500 includes judging if conditions for MAF sensor diagnostics or humidity sensor diagnostics are met. Conditions for MAF sensor diagnostic may include a flag for MAF sensor diagnostics being set by the controller. The flag for MAF sensor diagnostics set based on one or more of a diagnostic trouble code for MAF performance being indicated (e.g., the trouble code set based on a difference between mass airflow indicated by the MAF sensor during a previous engine operation and a predicted mass air flow during the previous engine operation greater than a threshold error), and a threshold duration elapsing since the previous MAF sensor diagnostics. Accordingly, it may be confirmed that the conditions for MAF sensor are met if the flag for MAF sensor diagnostics is set, as discussed above.

Conditions for humidity sensor diagnostics include a flag for humidity sensor diagnostics being set by the controller. The flag for humidity sensor diagnostics may be set during engine operation before the engine—off event at 504. The flag for humidity sensor diagnostics may be based on one or more of a humidity sensor reading below a threshold humidity indication for a threshold duration, and a threshold duration elapsing since the previous humidity sensor diagnostics. Further, conditions for humidity sensor diagnostics include determining if an ambient humidity is greater than a threshold humidity. The ambient humidity, when the onboard intake manifold humidity sensor is being diagnosed, may be determined based on an indication from a functional ambient humidity sensor. Additionally or alternatively, the ambient humidity may be estimated and/or inferred based on information retrieved from a cloud based computing system storing real-time weather information including ambient temperature, ambient pressure, and ambient humidity for a give geographical location. Furthermore, humidity sensor diagnostics may be performed when the vehicle is turned off, which may be determined based on position of a key for starting/stopping the vehicle in an OFF position. Accordingly, it may be confirmed that the conditions for humidity sensor are met if the vehicle is turned off, ambient humidity is greater than the threshold, and the flag for humidity sensor diagnostics being set, as discussed above. While the present example illustrates performing humidity sensor diagnostics when vehicle is off, it will be appreciated that in some examples, during engine off conditions when the vehicle is being propelled by the motor, if the ambient humidity is above the threshold and the engine temperature has stabilized to near intake air temperature, humidity sensor diagnostics may be performed.

If at 526, it is confirmed that conditions for MAF diagnostics are met, method 500 proceeds to 528. At 528, method 500 includes performing MAF sensor diagnostics by employing ELCM. Details of performing MAF sensor diagnostics will be further elaborated with respect to FIG. 7. If at 526, it is confirmed that conditions for humidity sensor diagnostics are met, method 500 proceeds to 530. At 530, method 500 includes performing humidity sensor diagnostics by employing ELCM pump. Details of performing humidity sensor diagnostics will be further elaborated with respect to FIG. 6. If humidity sensor diagnostic conditions are not met, such as ambient humidity less than threshold, method 500 may continue monitoring ambient humidity during the engine-off period, and when the ambient humidity reached the threshold humidity, humidity sensor diagnostics may be performed.

However, if conditions for both MAF sensor and humidity sensor diagnostics are met, MAF sensor diagnostics may be performed and completed prior to humidity sensor diagnostics. It will be appreciated that examples where the humidity sensor diagnostics is performed prior to the MAF sensor diagnostics when both conditions are met are also within the scope of the disclosure. Further, if conditions for MAF sensor diagnostics and/or humidity sensor diagnostics are not met, method 500 may continue monitoring operating conditions to determine if conditions for MAF and/or humidity sensor diagnostics are met during the engine off period, and perform MAF or humidity sensor diagnostics when conditions are satisfied. If the engine if turned on before performing the MAF or humidity sensor diagnostics, a flag may be set to reinitiate method 500 after next engine off event.

Figure 6:
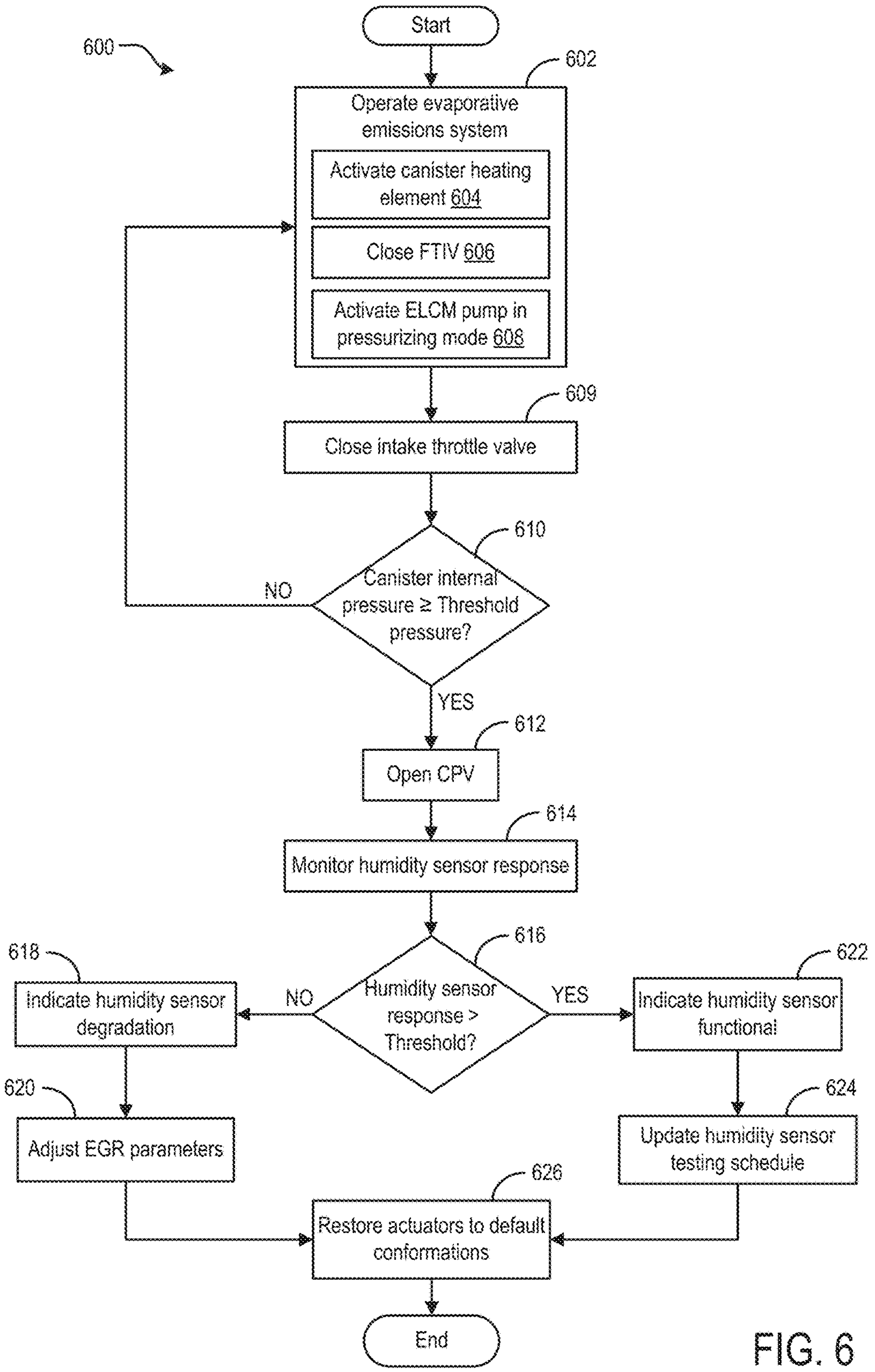
FIG. 6 shows a flow chart for performing intake manifold humidity sensor diagnostics utilizing an ELCM pump.

Turning to FIG. 6, it shows a flowchart illustrating a method 600 for performing diagnostics for an intake manifold humidity sensor, such as sensor 207 at FIG. 2. Specifically, method 600 illustrates performing humidity sensor diagnostics during engine-off conditions by employing an ELCM pump. Method 600 may be performed in coordination with method 500 described above at FIG. 5. As discussed above, method 600 may be performed when entry conditions for humidity sensor diagnostics are met. Entry conditions may include engine-off conditions, engine coolant temperature stabilized near intake air temperature (e.g., ECT within a threshold range of the intake air temperature and not fluctuating) and/or engine coolant temperature stabilized within a threshold range of ambient temperature, and ambient humidity above a threshold humidity. Instructions for carrying out method 600 may be executed by a controller of the vehicle system, such as controller 212 at FIG. 2, based on instructions stored in non-transitory memory of the controller, and in conjunction with signals received from sensors of the vehicle system, such as the sensors described above with reference to FIGS. 1-3D. The controller may employ actuators of the vehicle system, such as the actuators described with reference to FIGS. 1-3D, to perform humidity sensor diagnostics, according to the method described below.

Method begins at 602. At 602, method 600 includes operating the evaporative emissions system to perform humidity sensor diagnostics. Operating the evaporative emissions system to perform humidity sensor diagnostics includes, at 604, activating a canister heating element. For example, a thermoelectric canister heating element may be turned on in order to heat the interior of the fuel vapor canister. In some examples, wherein the canister heating element comprises a heat transfer mechanism, a thermal carrier may be heated to a threshold temperature, and then circulated through a heat exchanger to warm the canister. As warmer air may hold more water vapor, during humidity sensor diagnostics, the canister heating element may be turned on, based on a signal from the controller, to heat the air in the evaporative emissions system.

Further, operating the evaporative emissions system to perform humidity sensor diagnostics includes, at 606, closing the fuel tank isolation valve (e.g., FTIV 252). In some examples, the FTIV (or VBV, etc.) may be a default closed valve, and may thus be maintained in a closed conformation. For example, the controller may send a signal to an FTIV solenoid to close the FTIV or maintain the FTIV in a default closed configuration. In other examples, the fuel vapor canister may be decoupled from the fuel tank by any suitable means.

Furthermore, operating the evaporative emissions system includes, at 608, activating the ELCM pump in a pressurizing mode. For example, as described with regard to FIG. 3D, an ELCM changeover valve may be actuated to couple the fuel vapor canister to atmosphere via a vacuum pump, and then the vacuum pump may be activated such that atmospheric air is drawn into the canister vent and then pumped towards the fuel vapor canister vent port. In some examples, the ELCM pump may be activated only when the fuel vapor canister heating element has been activated for a duration. The duration may be pre-determined, or based on current operating conditions. In examples wherein the fuel vapor canister heating element is configured to heat purge air (rather than directly heating the canister adsorbent bed), the purge air may be circulated through the heating element for a duration prior to being directed to the fuel vapor canister.

Further, the canister purge valve (e.g., CPV 261) may be maintained in a default closed conformation.

Next, at 609, method 600 includes closing a throttle valve. For example, an ETC may be closed, such as throttle 262 shown in FIG. 2. The throttle valve may be placed in a fully closed position. For example, the controller may signal an actuator of the throttle valve (e.g., throttle motor) to close the throttle valve.

Next, method 600 proceeds to 610. At 610, method 600 includes determining if a pressure within the evaporative emissions system, as indicated by a pressure sensor, such as pressure sensor 292 at FIG. 2, is at or greater than a threshold pressure. The threshold pressure may be based on a desired temperature of the evaporative emissions system, which may be estimated based on a sensor, such as sensor 232, coupled to the canister. For example, when the FTIV and CPV are closed, operating the ELCM in the pressure mode may cause air from the ambient to be pumped into the evaporative emissions system, resulting in increase in pressure within the evaporative emissions system. Further, as the CPV and FTIV are closed, pressure indicated by the ELCM pressure sensor is the pressure within the canister side of the evaporative emissions system.

Upon the evaporative emissions system pressure reaching the threshold pressure, method 600 proceeds to 612. At 612, method 600 includes opening a canister purge valve. By opening the canister purge valve, pressurized atmospheric air pumped into the fuel vapor canister and further heated in the fuel vapor canister is flowed into the engine intake. When the pressurized and heated air is flown into the intake, which is at a lower temperature than the compressed air, the water vapor in the air in the intake manifold condenses to a liquid state. A humidity sensor that is functioning within a threshold error limit would respond to the sudden increase in humidity in the intake manifold resulting from the condensation.

Accordingly, upon opening the canister purge valve, method 600 proceeds to 614. At 614, method 600 includes monitoring the humidity response. For example, the controller may monitor the humidity sensor output over time, from a first time point before opening the canister purge valve to a second time point after opening the canister purge valve.

Next, method 600 proceeds to 616. At 616, method 600 includes determining if the humidity sensor response is greater than a threshold. For example, the controller may compare a first humidity sensor output recorded prior to opening the canister purge valve (at the first time point) to a second humidity sensor output recorded after opening the canister purge valve (at the second time point). If a difference in the humidity indicated between the first and second time points is greater than a threshold difference in humidity, it may be confirmed that the humidity sensor response is greater than the threshold, and method 600 proceeds to 622. At 622, method 600 includes indicating that the humidity sensor is functional. Indicating that the humidity sensor is functional may include recording or storing the passing test result at the controller. Upon determining that the humidity sensor is functional, and storing the passing result at the controller, method 600 proceeds to 624. At 624, method 600 includes adjusting humidity sensor testing schedules. For example, a timing of and/or entry conditions for a next functionality test of the humidity sensor may be adjusted. Further, the information gathered during the execution of method 600 may provide an indication of the functionality of other evaporative emissions system elements. For example, the functionality of the ELCM pump may be validated, and the timing of a subsequent ELCM pump test adjusted. Further, restrictions (and/or the absence of restrictions) in the canister vent and canister purge pathways may be indicated, and the timing and/or parameters of subsequent tests adjusted.

Returning to 616, if it is confirmed that the humidity sensor response is not greater than the threshold, method 600 proceeds to 618. At 618, method 600 includes indicating degradation of the intake manifold humidity sensor. Indicating degradation of the intake manifold humidity sensor may include setting a flag at a controller, and may further include indicating degradation to the vehicle operator, e.g., via a dash malfunction indicator lamp. The humidity sensor response may be stored at the controller, and may indicate a degree of degradation (e.g., non-functional, partially functional, etc.). Continuing at 620, method 600 may include adjusting exhaust gas recirculation parameters during subsequent engine operations until the degraded humidity sensor is replaced or repaired. For example, EGR may be ramped in less aggressively when humidity sensor fails, so as to not cause hesitations/stumbles due to potentially high humidity condition. As an example, when EGR is turned on, an amount of EGR supplied to the engine may be reduced (less than a desired amount of EGR may be supplied). After a threshold number of combustion cycles, the desired amount of EGR may be supplied. The amount of EGR supplied may be adjusted by controlling an opening of the EGR valve, for example.

When exhaust gas recirculation parameters and/or testing schedules have been adjusted, method 600 proceeds to 626. At 626, method 600 includes restoring evaporative emissions system actuators and engine system actuators to their default configurations. For example, the ELCM vacuum pump may be turned off, and an ELCM COV may be actuated to couple the fuel vapor canister directly to atmosphere. The canister purge valve may be closed and the FTIV placed in a default condition. During humidity sensor diagnostics, the throttle valve may be closed. After the diagnostics is completed (that is, after determining if the humidity sensor is degraded or functional), the throttle valve may be briefly opened to vent the air in the intake manifold to the atmosphere, before returning the throttle valve to the closed position. The canister heating element, as well as any associated thermal elements may be turned off. The engine controller may then be placed in a sleep/low power mode, depending on operating conditions. Method 600 may then end.

In this way, functionality of the intake manifold humidity sensor may be tested by utilizing the ELCM pump in a pressure mode during conditions when the engine is turned off.

Figure 7:
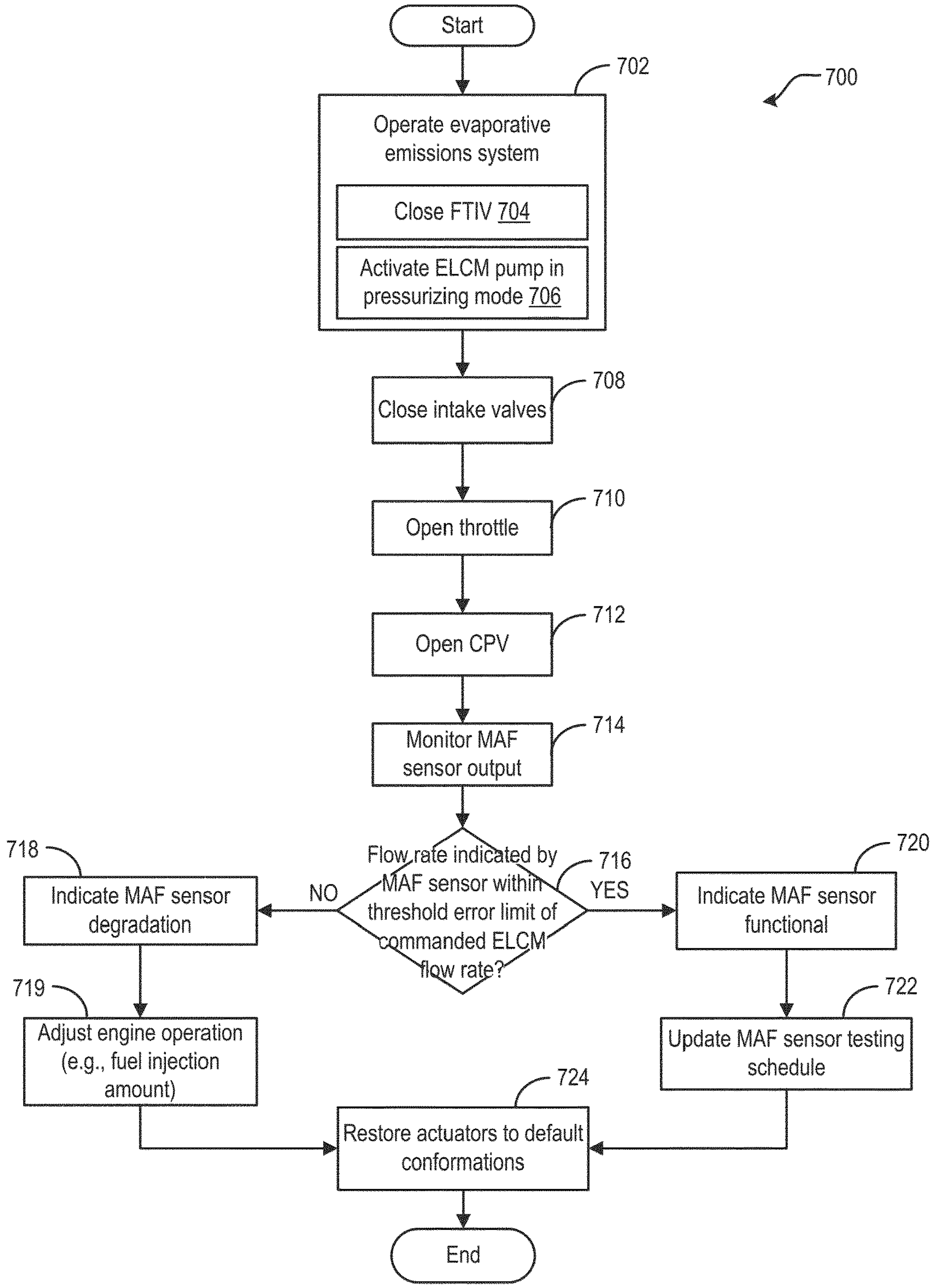
FIG. 7 shows a flow chart for performing MAF sensor diagnostics utilizing an ELCM pump.

Turning to FIG. 7, it shows a flowchart illustrating a method 700 for performing MAF sensor diagnostics. Specifically, method 700 illustrates performing diagnostics for a MAF sensor, such as sensor 202, during engine-off conditions by employing an ELCM pump. Method 700 may be performed in coordination with method 500 described above at FIG. 5. Instructions for carrying out method 500 may be executed by a controller of the vehicle system, such as controller 212 at FIG. 2, based on instructions stored in non-transitory memory of the controller, and in conjunction with signals received from sensors of the vehicle system, such as the sensors described above with reference to FIGS. 1-3D. The controller may employ actuators of the vehicle system, such as the actuators described with reference to FIGS. 1-3D, to perform MAF sensor diagnostics, according to the method described below.

Method begins at 702. At 702, method 700 includes operating the evaporative emissions system to perform MAF sensor diagnostics. Operating the evaporative emissions system includes, at 704, closing the FTIV. In some examples, the FTIV (or VBV, etc.) may be a default closed valve, and may thus be maintained in a closed conformation. In other examples, the fuel vapor canister may be decoupled from the fuel tank by any suitable means.

Furthermore, operating the evaporative emissions system to initiate MAF diagnostics includes, at 706, activating the ELCM pump in a pressurizing mode. For example, as described with regard to FIG. 3D, an ELCM changeover valve may be actuated to couple the fuel vapor canister to atmosphere via a vacuum pump, and then the vacuum pump may be activated such that atmospheric air is drawn into the canister vent and then pumped towards the fuel vapor canister vent port. Further, the controller may command the ELCM to flow pressurized air at a predetermined flow rate. In one example, the predetermined flow rate may be 1 liter per minute. Furthermore, while performing MAF sensor diagnostics, a canister heating element may not be activated.

Next, at 708, method 700 includes adjusting the intake valves in all the engine cylinders in a closed position. To reduce air flow through the engine during MAF sensor diagnostics when the engine not operating (not combusting), a cylinder valve operation (e.g., valve lift) may be adjusted. For example, the controller may command the actuators of the intake valve (s) in all the engine cylinders to adjust the intake valves to a fully closed position (e.g., no valve lift). In one example, where a cylinder valve is a cam-actuated valve, adjusting the cylinder valve operation may include adjusting a position of a cam phaser coupled to (a cam of) the cylinder valve. In another example, where the cylinder valve is an electrically-actuated valve, the cylinder valve operation may be substantially immediately performed. By closing the intake valves during MAF diagnostics, the air pumped by the ELCM is forced to flow into the intake manifold and towards the MAF sensor, without flowing into the cylinders. Further, the intake valves of all the cylinders may be maintained in the closed position with no valve lift until the MAF sensor diagnostics is completed.

Next, upon closing the intake valves, method 700 proceeds to 710. At 710, method 700 includes opening a throttle valve. For example, the controller may command an actuator of the intake throttle, such as a motor coupled to the throttle, to move the throttle to a fully open position. Accordingly, at 710, the throttle valve may be placed in a wide-open throttle position.

Next, method 700 proceeds to 712. At 712, method 700 includes opening a canister purge valve. Opening the canister purge valve includes duty cycling the canister purge valve to an approximate orifice size. For example, controller may adjust the duty cycle supplied to the CPV solenoid such that the opening of the CPV is adjusted to the orifice size. By opening the canister purge valve (CPV), atmospheric air pumped by the ELCM is flowed into the engine intake via the CPV. Further, as the intake valves of all the engine cylinders are closed, air pumped by the ELCM is flowed to the intake manifold without being diverted to the cylinders. Thus, air flow from the ELCM is the air flow through the engine intake system. Further, as the throttle is placed in the wide-open throttle position, air flow from the intake manifold is directed towards the atmosphere via the throttle, without obstruction from the throttle. Thus, when the ELCM is operating in the pressurized mode at the predetermined commanded flow rate, the intake valves are closed, and throttle is at wide-open throttle position, the ELCM draws air from the atmosphere via the exhaust passage and pumps the air towards the canister. Air then flows into the intake manifold via canister and CPV. From the intake manifold, air flows to the atmosphere (on the intake side) via the throttle valve and the intake passage at approximately the predetermined flow rate commanded from the ELCM. Since MAF sensor is essentially a flowmeter, a reference flowrate of the ELCM may be estimated by duty cycling the CPV valve to approximate an orifice size. Then using Bernoulli's equation, with the delta pressure across the CPV known and air density estimated, the reference flow rate of the ELCM may be correlated to a flow rate indicated by the MAF sensor. If the variance between the reference flow rate and the flow rate indicated by the MAF sensor is greater than a threshold variance, MAF sensor is diagnosed to be degraded.

Accordingly, next, method 700 proceeds to 714. At 714, method 700 includes monitoring the MAF sensor output. For example, the controller may monitor the MAF sensor output over time, and determine a flow rate based on an indication from the MAF sensor.

Next, method 700 proceeds to 716. At 716, method 700 includes determining if the MAF sensor response is within a threshold limit of the reference ELCM flow rate. For example, the controller may determine a flow rate based on indication from the MAF sensor and compare the flow rate with the flow rate commanded from the ELCM (Hereinafter ELCM flowrate). The threshold limit may be calculated based on the ELCM flow rate, and may take into account intake manifold volume, delta pressure across the CPV, and air density. For example, as discussed above, a reference flowrate of the ELCM may be estimated by duty cycling the CPV valve to approximate an orifice size, such as size of orifice 340 at FIGS. 3A-3D. Then using Bernoulli's equation, with the delta pressure across the CPV known and air density estimated, the reference flow rate of the ELCM may be correlated to a flow rate indicated by the MAF sensor. If the flow rate indicated by the MAF sensor is not within the threshold limit of reference ELCM flow rate is greater than a threshold difference in flow rate, MAF sensor is degraded. Accordingly, method 700 proceeds to 718. At 718, method 700 includes indicating degradation of the MAF sensor. Indicating degradation of the MAF sensor may include setting a flag at a controller, and may further include indicating degradation to the vehicle operator, e.g., via a dash malfunction indicator lamp. The MAF sensor response may be stored at the controller, and may indicate a degree of degradation (e.g., non-functional, partially functional, etc.).

Upon indicating degradation of the MAF sensor, method 700 proceeds to 719. At 719, method 700 includes adjusting engine operation taking into account MAF sensor degradation. For example, during next engine operation when the engine if turned on, output from the degraded MAF sensor may not be utilized; instead, mass air flow into the intake may be estimated by an alternate method (e.g., by utilizing MAP, engine speed, and throttle position), and fuel injection amount may be adjusted based on the estimated mass air flow.

Returning to 716, if a difference between the flow rate indicated by the MAF sensor and the ELCM flow rate is less than the threshold difference in flow rate, it may be confirmed that the MAF sensor output is within the threshold limit of the commanded ELCM flow rate, and method 700 proceeds to 720. At 720, method 700 includes indicating that the MAF sensor is functional. Indicating that the MAF sensor is functional may include recording or storing the passing test result at the controller. Upon determining that the MAF sensor is functional, and storing the passing result at the controller, method 700 proceeds to 724. At 724, method 700 includes adjusting MAF sensor testing schedules. For example, a timing of and/or entry conditions for a next functionality test of the MAF sensor may be adjusted. Further, the information gathered during the execution of method 700 may provide an indication of the functionality of other evaporative emissions system elements. For example, the functionality of the ELCM pump may be validated, and the timing of a subsequent ELCM pump test adjusted. Further, restrictions (and/or the absence of restrictions) in the canister vent and canister purge pathways may be indicated, and the timing and/or parameters of subsequent tests adjusted.

When MAF degradation has been indicated and/or testing schedules have been adjusted, method 700 proceeds to 726. At 726, method 600 includes restoring evaporative emissions system actuators and engine system actuators to their default configurations. For example, the ELCM vacuum pump may be turned off, and an ELCM COV may be actuated to couple the fuel vapor canister directly to atmosphere. The canister purge valve may be closed, the throttle may be closed, and the FTIV placed in a default condition. The engine controller may then be placed in a sleep/low power mode, depending on operating conditions. Method 700 may then end.

In this way, functionality of the MAF sensor may be tested by utilizing the ELCM pump in a pressure mode during engine off conditions.

Figure 8:
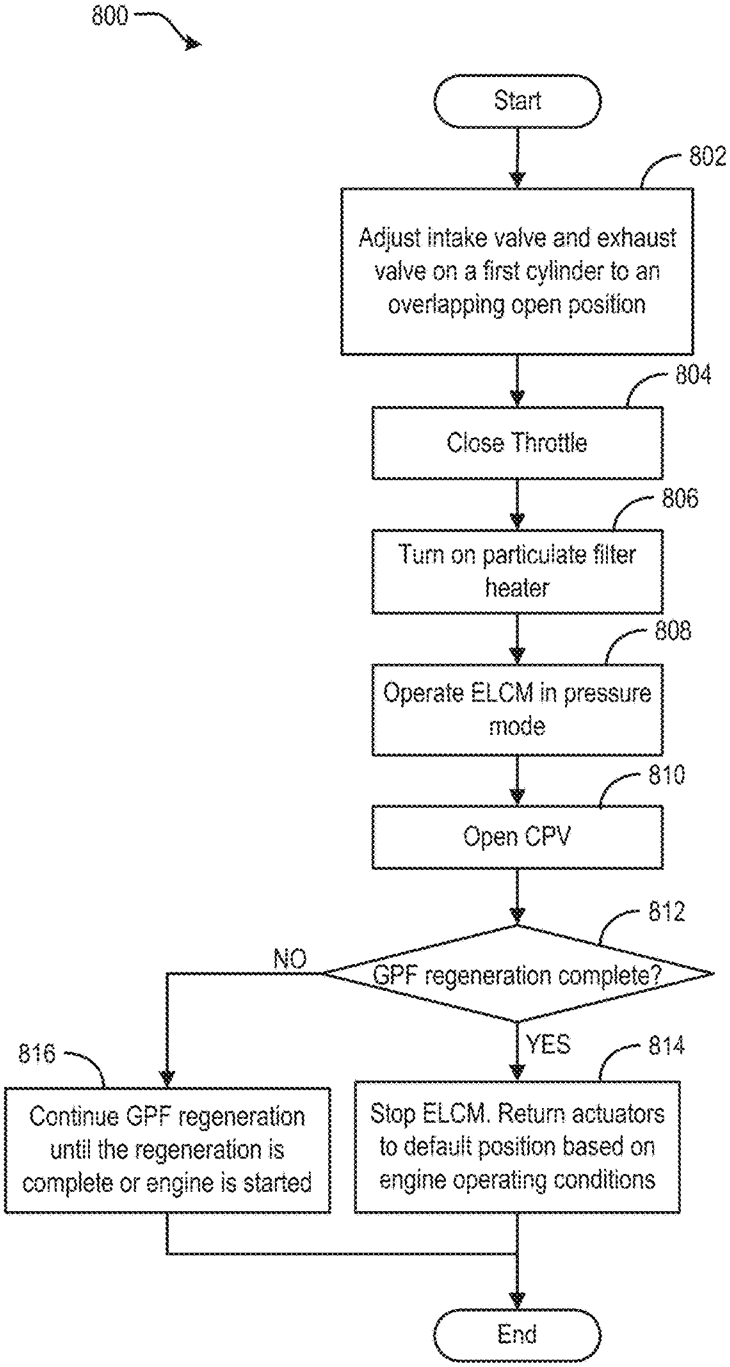
FIG. 8 shows a flow chart for performing particulate filter regeneration utilizing an ELCM pump.
Figure 9:
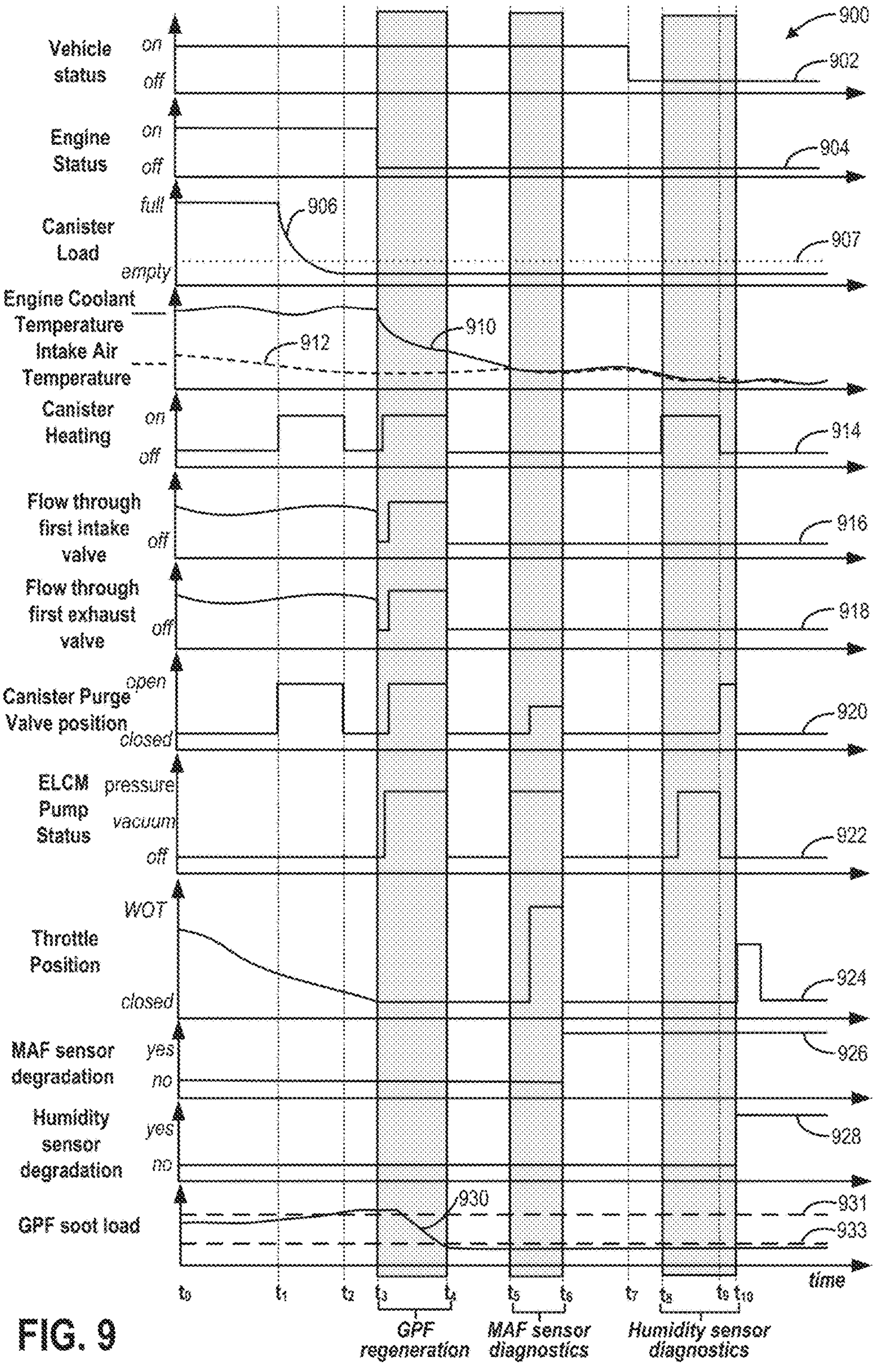
FIG. 9 shows an example operating sequence for performing one or more of intake manifold humidity sensor diagnostics, MAF sensor diagnostics, and particulate filter regeneration using an ELCM pump.

Turning to FIG. 8, it shows a flowchart illustrating a method 800 for performing regeneration of a particular filter, such as particulate filter 241. Specifically, method 800 illustrates performing particulate filter regeneration during engine-off conditions by employing an ELCM pump. Method 800 may be performed in coordination with method 500 described above at FIG. 5. Instructions for carrying out method 500 may be executed by a controller of the vehicle system, such as controller 212 at FIG. 2, based on instructions stored in non-transitory memory of the controller, and in conjunction with signals received from sensors of the vehicle system, such as the sensors described above with reference to FIGS. 1-3D. The controller may employ actuators of the vehicle system, such as the actuators described with reference to FIGS. 1-3D, to perform particulate filter regeneration, according to the method described below.

At 802, method 800 includes adjusting one or more intake valves and one or more exhaust valves on a first cylinder such that a first intake valve and a first exhaust valve on the first cylinder are at overlapping open positions. Specifically, an amount of overlap between the first intake valve and first exhaust valve on the first cylinder may be greater than a threshold amount of overlap. For example, the controller may command an actuator (e.g., cam actuator or electrical actuator) of the first intake valve in the first engine cylinder to adjust the first intake valve to an open position. Further, the controller may command an actuator (e.g., cam actuator or electrical actuator) of the first exhaust valve in the first engine cylinder to adjust the first exhaust valve to an open position such that the first intake and exhaust valve opening are overlapping in order to provide air flow through the first cylinder.

In some examples, an electric motor (e.g., motor 120) may be turned on via a high-voltage battery. The motor may be operated at a low speed to spin the engine briefly (e.g., one or two revolutions) such that an intake valve and an exhaust valve of a first cylinder are at overlapping open positions. The first cylinder may then be maintained with the intake and exhaust valve in overlapping open positions. In this way, a path may be provided for oxygen to travel towards the particulate filter via the first cylinder. Intake valves on the rest of the cylinders (other than the first cylinder) may be adjusted to respective closed positions (e.g., no valve lift).

By adjusting the intake valves and the exhaust valves on the first cylinder to overlapping open positions, a path for air flow through the first cylinder towards the particulate filter may be established.

Further, during particulate regeneration the open overlapping positions of the first intake valve and the first exhaust valve may be maintained until the regeneration is completed.

Next, at 804, method 800 includes adjusting the throttle to a fully closed position. For example, the controller may command the throttle motor to move the throttle to a fully closed position.

Next, at 806, method 800 includes operating a particulate filter heater. For example, the controller may turn on a heating element within the particulate filter to increase a temperature of the particular filter. In some examples, additionally, a canister heating element may be operated.

Next, at 808, method 800 includes operating the ELCM in pressure mode. For example, as described with regard to FIG. 3D, an ELCM changeover valve may be actuated to couple the fuel vapor canister to atmosphere via a vacuum pump, and then the vacuum pump may be activated such that atmospheric air is drawn into the canister vent and then pumped towards the fuel vapor canister vent port. In some examples, the ELCM pump may be activated only when the particulate filter heating element has been activated for a duration, or the particulate filter temperature has reached a threshold temperature. The duration may be pre-determined.

Next, at 810, method 800 includes adjusting the CPV to a fully open position. For example, the controller may command an actuator of the CPV to open the CPV to the fully open position. In some examples, the CPV may be opened after the ELCM pressure sensor indicates a threshold pressure. The threshold pressure may be a predetermined value, for example.

During engine-off conditions, operating the ELCM to pressurize air, and opening the CPV, allows the ELCM to flow pressurized air to the intake manifold via canister and CPV. Further, as the intake and exhaust valves on the first cylinder are at overlapping open positions, and the throttle valve is closed, the air from the intake manifold may be not be allowed to escape to the atmosphere through the intake passage. Instead, the air may flow into the first cylinder via the intake valve of the first cylinder, and exit the first cylinder via the exhaust valve of the first cylinder. After exiting the first cylinder, the air may flow through the heated particulate filter. As the air flows through the heated particulate filter, it increases the temperature of the particulate filter. The increased temperature of the particulate filter in combination with oxygen supplied by air flow facilitates oxidation of the soot accumulated in the particulate filter. As a result, the particulate filter is regenerated. In this way, a particulate filter in an exhaust passage of an engine may be regenerated during engine-off by operating an ELCM pump disposed in an evaporative emissions system in a pressure mode, and directing flow of air from the evaporative emissions system to the intake manifold, and from the intake manifold via a cylinder towards the particulate filter.

Next, at 812, method 800 includes determining if particulate filter regeneration is completed. For example, the controller may determine if particulate filter regeneration is completed based on a duration of regeneration of the particulate filter. For example, the method may include determining if a time since regeneration started is greater than a time threshold. The time threshold may be set to a duration that is based on the particulate filter soot load before regeneration was initiated and/or a particulate regeneration model that provides an estimated time for regeneration. If the time is greater than the time threshold, the particulate filter regeneration may be determined to be complete; otherwise, it may be determined that the regeneration is not completed. In some examples, soot removal is estimated based on the amount air flow delivered over time to the filter while hot. This value is then subtracted from the residual calculation of soot at the previous engine run cycle. In some other examples, the soot may be estimated by observing the pressure drop across the filter at a given air flow, or inferred by observing the time the engine is at temperature, fuel and air flow conditions that would accumulate or remove soot; then maintaining a KAM register with the soot value.

Accordingly, at 812, if it is determined that the regeneration is not complete, method 800 proceeds to 816. At 816, method 800 includes continuing the regeneration by flowing air through the heated particulate filter via the first cylinder. The regeneration may be continued until the regeneration duration increases above the threshold, or until the engine is restarted, whichever occurs first.

At 812, if it determined that the regeneration is completed, method 800 proceeds to 814. At 814, method 800 includes stopping the ELCM and returning the actuators to default positions. For example, the ELCM vacuum pump may be turned off, and an ELCM COV may be actuated to couple the fuel vapor canister directly to atmosphere. The canister purge valve may be closed, the throttle may be closed, and the FTIV placed in a default condition. The engine controller may then be placed in a sleep/low power mode, depending on operating conditions. Method 700 may then end.

In this way, a particulate filter may be regenerated during engine OFF conditions without spinning the engine by utilizing the ELCM pump.

Turning to FIG. 9, an example operating sequence 900 for performing particulate filter regeneration, MAF sensor diagnostics, and humidity sensor diagnostics, during engine OFF conditions is illustrated. During each of the above-mentioned operations including particulate filter regeneration, MAF sensor diagnostics, and humidity sensor diagnostics, the ELCM pump may be operated in a pressure mode.

The sequence of FIG. 9 may be provided by the system of FIGS. 1-3D, according to the method of FIGS. 5-9. FIG. 9 shows one example operation for the situation identified. In one example, the parameters shown illustrate operation that may occur only during the time periods identified, although modifications may be made, if desired.

Vertical markers are shown at times $t_0$-$t_{11}$ to identify particular times of interest during the sequence.

FIG. 9 illustrates performing particulate filter regeneration, MAF sensor diagnostics, and humidity sensor diagnostics, during an engine OFF duration between time points $t_4$ and $t_{11}$, responsive to conditions for each of the particulate filter regeneration, MAF sensor diagnostics, and humidity sensor diagnostics being satisfied. It will be appreciated that, depending on the engine and/or vehicle operating conditions, only one, or any combination of the above-mentioned operations, may be performed during the engine OFF condition.

The first plot from the top of FIG. 9 represents vehicle operating status versus time. The Y axis represents an ON or an OFF condition of vehicle operation. A vehicle key for initiating operation of the vehicle is ON when the signal is at a high level and the vehicle key is OFF when the signal is at a low level.

The second plot from top of FIG. 9 represents engine operating status versus time. The Y-axis represents an ON or an OFF condition of engine operation. An ignition key is ON when the signal is at a high level and the ignition key is OFF when the signal is at a low level.

The third plot from the top of FIG. 9 represents canister load versus time. The Y-axis represents canister load, and the canister load increases in the direction of Y-axis arrow. Horizontal line 907 represents threshold load below which one or more of particulate filter regeneration, MAF sensor diagnostics, and humidity sensor diagnostics may be performed.

The fourth plot from the top of FIG. 9 represents temperature versus time. The Y-axis represents temperature, and the temperature increases in the direction of Y-axis arrow. Plot 910 represents change in engine coolant temperature, and plot 912 represents change in intake air temperature.

The fifth plot from top of FIG. 9 represents canister heating versus time. The Y-axis represents an ON or an OFF condition of canister heating operation. The canister heating is ON when the signal is at a high level and the canister heating is OFF when the signal is at a low level.

The sixth plot from the top of FIG. 9 represents flow through a first intake valve of a first cylinder versus time. The Y-axis represents flow through the first intake valve into the first cylinder, and the flow increases in the direction of Y-axis arrow. During engine ON operation, the flow through the intake valve is due to air, EGR gases, and PCV gases being drawn into the cylinder from the intake manifold for combustion, and thus, the flow may include flow of ambient air, EGR gases, and PCV gases. During engine OFF conditions, in this particular example, the flow through the intake valve is due to air pressurized by the ELCM and flown into the intake manifold via the canister and the CPV. Thus, the flow during engine OFF conditions may include ambient air and residual fuel vapor from the canister.

The seventh plot from the top of FIG. 9 represents flow through a first exhaust valve of a first cylinder versus time. The Y-axis represents flow through the first exhaust valve into the first cylinder, and the flow increases in the direction of Y-axis arrow. During engine ON operation, the flow through the exhaust valve is due to exhaust gases resulting from combustion, and thus, the flow may include flow of exhaust gases. During engine-off conditions, in this particular example, the flow through the exhaust valve is the flow through the intake valve. Thus, the flow through the first exhaust valve during engine OFF conditions may include ambient air and residual fuel vapor from the canister.

The eighth plot from the top of FIG. 9 represents canister purge valve (CPV) position versus time. The Y-axis represents position of the CPV, and the opening of the CPV increases in the direction of Y-axis arrow.

The ninth plot from the top of FIG. 9 represents ELCM status versus time. The Y-axis represents operating status of the ELCM. The ELCM is operating in a pressure mode when the signal is at a high level and the ELCM is OFF when the signal is at a low level.

The tenth plot from the top of FIG. 9 represents position of throttle, such as throttle 262 at FIG. 2, versus time. The Y-axis represents the position of the throttle, and the position of the throttle changes from a fully closed position to a fully open position in the direction of the Y axis arrow.

The eleventh plot from the top of FIG. 9 represents indication of MAF sensor degradation versus time. The Y-axis represents an indication of MAF sensor degradation. The MAF sensor is indicted degraded when the signal is at a high level, and the MAF sensor is indicated not degraded when the signal is at a low level.

The twelfth plot from the top of FIG. 9 represents humidity sensor degradation versus time. The Y-axis represents an indication of humidity sensor degradation. The humidity sensor is indicted degraded when the signal is at a high level, and the humidity sensor is indicated not degraded when the signal is at a low level.

The thirteenth plot from the top of FIG. 9 represents particulate filter (PF) soot load versus time. The Y-axis represents a particulate filter soot load, and the particulate filter soot load increases in the direction of Y-axis arrow.

In all the plots discussed above, the X-axis represents time and time increases from the left side of the plots to the right side of the plots.

At time t0, the vehicle is on, as indicated by plot 902, and the engine is on, as indicated by plot 904. The canister heating is off, as indicated by plot 914, the FTIV is closed (not shown) and the canister purge valve is closed, as indicated by plot 920. The ELCM pump is off, as indicated by plot 922, and the ELCM COV is in a venting position, not shown (see FIG. 3C as an example). The canister has a load that is approaching full capacity, as indicated by plot 906.

Accordingly, at time t1, a canister purge event is initiated. The canister heating element is turned on, and the canister purge valve is opened, while the FTIV is maintained closed and the ELCM is maintained in its current configuration. Opening the canister purge valve causes atmospheric air to be drawn through the fuel vapor canister, desorbing the stored fuel vapor to the engine intake for combustion. Accordingly, the canister load decreases until time t2, when the canister purge valve is closed, and the canister heating element is turned off. After the canister purge operation is completed, the engine continues to operate between times t2 and t3, and soot load of the particulate filter increases above the first threshold 931. Responsive to the soot load increasing above the first threshold, prior to t3, the engine controller may set a flag to regenerate particulate filter at next engine OFF.

At time t3, the engine is turned off, and the throttle is placed in a closed position, as shown by plot 924. The engine coolant temperature is significantly higher than the intake air temperature, as shown by plots 910 and 912, respectively. Further, responsive to the flag to regenerate particulate filter set before t3, and the canister load below threshold, the engine controller may perform particulate filter regeneration during engine off conditions between t3 and t4. Accordingly, between t3 and t4, the canister heating is turned on, the particulate filter heating is turned on (not shown), and the ELCM pump is operated in a pressure mode. The ELCM COV is placed in a restricting position, coupling the canister to atmosphere via the ELCM pump. Thus, atmospheric air is drawn into the canister vent. Further, between t3 and t4, the controller may provide signals to actuators of the intake valve and the exhaust valve on the first engine cylinder to adjust valve lift of the intake valve and the exhaust valve, and an amount of overlap of intake valve opening and exhaust valve opening, such that the intake valve and the exhaust valve are adjusted to overlapping open positions. Further, the intake and exhaust valves may be maintained in the overlapping open position. Thus, between t3 and t4, the first intake valve and the first exhaust valve are in overlapping open positions, which provides a flow path for air through the first cylinder. Furthermore, the canister purge valve is opened, as indicated plot 920. As a result, ambient air pumped by the ELCM is flown into the intake manifold via the canister and the CPV. As the throttle valve is closed (plot 924), the pumped air is directed from the intake manifold through the first cylinder towards the exhaust manifold. From the exhaust manifold, pumped air flows into the particulate filter in the exhaust passage, which further increases the temperature of the particulate filter. The increase in particulate filter temperature and the air flow through the particulate filter causes the soot accumulated in the particulate filter to burn, thereby regenerating the particulate filter. In this way, between t3 and t4, during engine off conditions, the particulate filter is regenerated by using the ELCM pump for a threshold duration estimated based on soot load of the particulate filter before the regeneration.

At t4, the threshold duration may elapse and the soot load of the particulate filter may decrease below a second lower threshold 933. Responsive to the soot load below the second lower threshold, particulate filter regeneration may be terminated. Terminating the particulate filter regeneration may include turning off the ELCM pump, turning off heating the particulate filter, and returning the CPV to closed position. Turning off the ELCM and closing the CPV stops the air flow through the first cylinder and hence, through the particulate filter. Further, the intake and the exhaust valves on the first cylinder may be returned to their default engine off positions.

Further, as the engine is maintained off from time t3 to time t4, the engine coolant temperature decreases. However at t4, the engine coolant temperature may be greater than the intake air temperature. While in the present example, the engine coolant temperature is compared with the intake air temperature, it will be appreciated that examples where the engine coolant temperature is compared to an ambient temperature (based on indication from an ambient air temperature sensor) is also within the scope of the disclosure. As such, the entry conditions for MAF sensor diagnosis or humidity sensor diagnosis may not be satisfied at t4. Thus, the engine controller may be shifted to a sleep mode and woken up at t5 after a threshold soak duration. At t5, the engine coolant temperature may stabilize at the intake air temperature, which is the ambient temperature during engine off conditions. Further, at t5, the vehicle may continue to operate under engine off conditions. For example, the vehicle may be propelled by the motor while the engine is turned off. In some examples, the vehicle may be operating under idle stop conditions, during which the engine may be turned off. At t5, responsive to the engine coolant temperature stabilizing to the intake air temperature, the entry conditions for MAF sensor diagnostics may be satisfied. Accordingly, the controller may perform MAF diagnostics routine between t5 and t6. Between t5 and t6, the ELCM pump may be operated in pressure mode, thereby coupling the canister and the atmosphere via the ELCM. Further, between t5 and t6, when the MAF sensor diagnostics is performed, the canister is not heated. After a threshold duration, the canister purge valve may be opened to flow atmospheric air via the canister and the CPV into the intake manifold. The duty cycling of the CPV may be adjusted such that an amount of opening of the CPV correlates with the orifice size, such as orifice 340 at FIGS. 3A-3D. In this example, the amount of opening of the CPV (based on the orifice size) is less than the amount of opening when the CPV is at the fully open position. Further, in addition to opening CPV, between t5 and t6, the throttle may be adjusted to the fully open position (that is, wide open throttle) in order to allow air flow from the intake manifold to the atmosphere via the intake passage. Further still, the intake valves on all the engine cylinders may be adjusted to a fully closed position so that air flow may not be diverted to the engine cylinders, and the all the air pumped by the ELCM flows through the intake manifold where the MAF sensor is located. Thus, MAF sensor may be diagnosed based on air flow indicated by the MAF sensor compared to the ELCM flow rate. Accordingly, between t5 and t6, the controller may compare the flow rate indicated by the MAF sensor and the ELCM flow rate. At t6, the controller may determine that the difference between the ELCM flow rate and the flow rate indicated by the MAF sensor is greater than a threshold difference. Accordingly, at t6, MAF sensor degradation is indicated, as shown by plot 926. The evaporative emissions system and the engine system are then restored to a default configuration. The ELCM COV is placed in a venting position, and the ELCM pump is turned off. The canister purge valve and throttle are closed, and the FTIV is maintained closed.

Next, at t7, the vehicle may be turned off, and the engine continues to remain off. The engine coolant temperature may be at the intake air temperature. At t8, the ambient humidity may increase above a threshold, and accordingly, the entry conditions for the humidity sensor may be satisfied.

Between t8 and t10, responsive to entry conditions for the humidity sensor diagnostics met, the controller performs humidity sensor diagnostics. As such, the canister heating is turned on. After a threshold duration after the canister is turned on, the ELCM pump is operated in a pressure mode. The canister purge valve may remain closed and the throttle valve may remain closed. At t9, responsive to ELCM operating in the pressure mode, and the CPV in a closed position, pressure in the evaporative emissions system increases. Further, canister heating increases temperature of the air pumped by the ELCM in the canister. Thus, temperature and pressure of the air in the evaporative emissions system increases. The evaporative emissions system pressure is indicated by an ELCM pressure sensor. At t9, the pressure may reach a threshold pressure, responsive to which the CPV is opened. As a result, compressed hot air flows via the CPV and into the intake manifold, where it cools down, which causes the water vapor in air to condense. As a result, humidity in the intake manifold increases. The controller monitors the output from the intake manifold humidity sensor. However, the humidity sensor response (not shown) is below a threshold. The humidity sensor response may be confirmed to be below a threshold when a difference between the humidity indicated before the CPV is opened and the humidity indicated after the CPV is opened is less than an expected difference. Responsive to the humidity sensor response below the threshold, humidity sensor degradation is indicated at t10, as shown in plot 928. Further at t10, the throttle may be opened for a brief duration to vent the air to the atmosphere via the intake passage.

In this way, during engine off conditions, one or more of particulate filter regeneration, MAF sensor diagnostics, and intake humidity sensor diagnostics may be performed.

As one embodiment, a method for an engine includes during a first condition when an engine is combusting fuel, adjusting engine operation based on an output of a sensor disposed in an intake of the engine; and during a second condition when the engine is off, indicating degradation of the sensor based on an output of the sensor while flowing air from an evaporative emissions system past the sensor. A first example of the method includes during the second condition, flowing air from the evaporative emissions system past the sensor in response to an engine coolant temperature decreasing to a threshold temperature, the threshold temperature based on an intake air temperature. A second example of the method optionally includes the first example and further includes wherein flowing air from the evaporative emissions system past the sensor includes operating an evaporative leak detection pump in a pressure mode to pump air through a fuel vapor canister coupled to a purge line of the evaporative emission system, the purge line coupled between the fuel vapor canister and the intake of the engine; and wherein flowing air from the evaporative emission system past the sensor further includes opening a canister purge valve disposed in the purge line. A third example of the method optionally includes one or more of the first and second examples, and further includes wherein the sensor is an intake manifold humidity sensor, the humidity sensor indicating humidity of the air in the intake of the engine. A fourth example of the method optionally includes one or more of the first through third examples, and further includes, wherein flowing air from the evaporative emission system past the sensor further includes operating a heater coupled with the fuel vapor canister, and opening a canister purge valve disposed in the purge line when a pressure of the evaporative emissions system indicated by a pressure sensor disposed within the ELCM increases above a threshold pressure. A fifth example of the method optionally includes one or more of the first through fourth examples, and further includes, wherein indicating degradation of the sensor based on the output of the sensor includes indicating degradation in response to a difference between a first humidity sensor output before flowing air from the evaporative emissions system past the sensor and a second humidity sensor output while flowing air from the evaporative emissions system past the sensor greater than a threshold difference. A sixth example of the method optionally includes one or more of the first through fifth examples, and further includes, during the second condition, flowing air from the evaporative emissions system past the sensor in response to an ambient humidity greater than a threshold humidity, the ambient humidity indicated by one or more of an onboard ambient humidity sensor output and a local ambient humidity information retrieved from a cloud system communicating with an engine controller. A seventh example of the method optionally includes one or more of the first through sixth examples, and further includes, in response to not indicating degradation, adjusting engine operation based on an output of the humidity sensor; and wherein adjusting engine operation based on the output of the humidity sensor includes adjusting an amount of EGR delivered to the intake when EGR is ON; and in response to indicating engine degradation, during a next engine operation when EGR is ON, adjusting an amount of EGR delivered to the intake independent of the humidity sensor output. An eighth example of the method optionally includes one or more of the first through seventh examples, and further includes, wherein the sensor is a mass air flow (MAF) sensor. A ninth example of the method optionally includes one or more of the first through eighth examples, and further includes, wherein indicating degradation of the sensor based on the output of the sensor includes comparing a first flow rate determined based on an output of the MAF sensor to a second flow rate based on ELCM pump operation, and indicating degradation of the MAF sensor in response to a difference between the second flow rate and the first flow rate greater than a threshold difference. A tenth example of the method optionally includes one or more of the first through ninth examples, and further includes, in response to indicating degradation of the MAF sensor, during a subsequent engine operation, adjusting fueling based on an estimated mass air flow, the estimated mass air flow based on an indication from a manifold air pressure sensor, an indication from a throttle position sensor, and an engine speed. A eleventh example of the method optionally includes one or more of the first through tenth examples, and further includes, in response to not indicating degradation of the MAF sensor, during a subsequent engine operation, adjusting fueling based on the output of the MAF sensor. A twelfth example of the method optionally includes one or more of the first through eleventh examples, and further includes, during the first condition, estimating a soot load of a gasoline particulate filter disposed within an exhaust passage; and during the second condition, responsive to the soot load greater than a threshold, activating a particulate filter heating element, flowing air from the evaporative emissions system to the intake, and subsequently flowing air from the intake to the particulate filter via a first cylinder. A thirteenth example of the method optionally includes one or more of the first through twelfth examples, and further includes, wherein flowing air from the evaporative emissions system to the intake, and subsequently flowing air from the intake to the particulate filter via a first cylinder includes closing an intake throttle, and adjusting an intake valve of the first cylinder and an exhaust valve of the first cylinder at overlapping open positions.

As another embodiment, a method for an engine includes during an engine off period, in response to engine coolant temperature decreasing to a threshold temperature: flowing heated and pressurized ambient air from an evaporative emissions system to an intake passage; and indicating degradation of a humidity sensor disposed in the intake passage in response to an output of the humidity sensor not changing by a threshold amount. A first example of the method includes wherein flowing heated and pressurized ambient air from the evaporative emissions system includes operating an evaporative leak detection pump to pump pressurized air into a fuel canister, operating a heater coupled with the fuel canister to heat the pressurized air, and opening a canister purge valve when a pressure indicated by a pressure sensor disposed in the evaporative emissions system reaches a threshold pressure. A second example of the method optionally includes the first example and further includes in response to the output of the humidity sensor changing at least by the threshold amount, adjusting exhaust gas recirculation during a subsequent engine operation based on the output of the humidity sensor.

As another embodiment, a method for an engine includes during an engine-off condition, responsive to a fuel vapor canister load less than a threshold and an engine coolant temperature within a threshold temperature range of an engine intake air temperature: isolating a fuel vapor canister from a fuel tank; coupling the fuel vapor canister to atmosphere via an evaporative leak check module vacuum pump; activating the evaporative leak check module vacuum pump in a conformation to pump atmospheric air into the fuel vapor canister; opening a canister purge valve; opening an air intake throttle; and indicating degradation of a MAF sensor disposed in an intake manifold in response to an output of the MAF sensor being outside of a threshold range. A first example of the method includes indicating functionality of the MAF sensor responsive to the output of the MAF sensor being within the threshold range; and updating one or more evaporative emissions system testing schedules. A second example of the method optionally includes the first example and further includes adjusting one or more engine operating parameters based on an estimated mass air flow during a next engine operation responsive to an indication of degradation of the MAF sensor, the estimated mass air flow based on an intake manifold pressure, a throttle position, and an engine speed; and wherein the threshold flow range is based on a commanded operating flow rate of the pump.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:

during a first condition when an engine is combusting fuel, adjusting engine operation based on an output of a sensor disposed in an intake of the engine; and during a second condition when the engine is off, indicating degradation of the sensor based on an output of the sensor while flowing air from an evaporative emissions system past the sensor.

2. The method of claim 1, wherein the engine is coupled in a hybrid-electric vehicle, and the method further comprising, during the second condition, flowing air from the evaporative emissions system past the sensor in response to an engine coolant temperature decreasing to a threshold temperature, the threshold temperature based on an intake air temperature.

3. The method of claim 1, wherein flowing air from the evaporative emissions system past the sensor includes operating an evaporative leak detection pump in a pressure mode to pump air through a fuel vapor canister coupled to a purge line of the evaporative emission system, the purge line coupled between the fuel vapor canister and the intake of the engine; and wherein flowing air from the evaporative emission system past the sensor further includes opening a canister purge valve disposed in the purge line.

4. The method of claim 1, wherein the sensor is an intake manifold humidity sensor, the humidity sensor indicating humidity of the air in the intake of the engine.

5. The method of claim 4, wherein flowing air from the evaporative emission system past the sensor further includes operating a heater coupled with the fuel vapor canister, and opening a canister purge valve disposed in a purge line when a pressure of the evaporative emissions system indicated by a pressure sensor disposed within an evaporative leak check module (ELCM) increases above a threshold pressure.

6. The method of claim 4, wherein indicating degradation of the sensor based on the output of the sensor includes indicating degradation in response to a difference between a first humidity sensor output before flowing air from the evaporative emissions system past the sensor and a second humidity sensor output while flowing air from the evaporative emissions system past the sensor greater than a threshold difference.

7. The method of claim 4, further comprising, during the second condition, flowing air from the evaporative emissions system past the sensor in response to an ambient humidity greater than a threshold humidity, the ambient humidity indicated by one or more of an onboard ambient humidity sensor output and a local ambient humidity information retrieved from a cloud system communicating with an engine controller.

8. The method of claim 5, further comprising:

in response to not indicating degradation, adjusting engine operation based on an output of the humidity sensor; and wherein adjusting engine operation based on the output of the humidity sensor includes adjusting an amount of EGR delivered to the intake when EGR is ON; and in response to indicating engine degradation, during a next engine operation when EGR is ON, adjusting an amount of EGR delivered to the intake independent of the humidity sensor output.

9. The method of claim 1, wherein the sensor is a mass air flow (MAF) sensor.

10. The method of claim 9, wherein flowing air from the evaporative emission system past the sensor further includes opening a canister purge valve disposed in a purge line, an amount of opening of the canister purge valve based on a size of a reference orifice included within an ELCM; and wherein indicating degradation of the sensor based on the output of the sensor includes comparing a first flow rate determined based on an output of the MAF sensor to a second flow rate based on ELCM pump operation, and indicating degradation of the MAF sensor in response to a difference between the second flow rate and the first flow rate greater than a threshold difference.

11. The method of claim 10, further comprising, in response to indicating degradation of the MAF sensor, during a subsequent engine operation, adjusting fueling based on an estimated mass air flow, the estimated mass air flow based on an indication from a manifold air pressure sensor, an indication from a throttle position sensor, and an engine speed.

12. The method of claim 10, further comprising, in response to not indicating degradation of the MAF sensor, during a subsequent engine operation, adjusting fueling based on the output of the MAF sensor.

13. The method of claim 1, further comprising:

during the first condition, estimating a soot load of a gasoline particulate filter disposed within an exhaust passage; and during the second condition, responsive to the soot load greater than a threshold, activating a particulate filter heating element, flowing air from the evaporative emissions system to the intake, and subsequently flowing air from the intake to the particulate filter via a first cylinder.

14. The method of claim 13, wherein flowing air from the evaporative emissions system to the intake, and subsequently flowing air from the intake to the particulate filter via a first cylinder includes closing an intake throttle, and adjusting an intake valve of the first cylinder and an exhaust valve of the first cylinder at overlapping open positions.

15. A method, comprising:

during an engine off period, in response to engine coolant temperature decreasing to a threshold temperature:

flowing heated and pressurized ambient air from an evaporative emissions system to an intake passage; and indicating degradation of a humidity sensor disposed in the intake passage in response to an output of the humidity sensor not changing by a threshold amount.

16. The method of claim 15, wherein flowing heated and pressurized ambient air from the evaporative emissions system includes operating an evaporative leak detection pump to pump pressurized air into a fuel canister, operating a heater coupled with the fuel canister to heat the pressurized air, and opening a canister purge valve when a pressure indicated by a pressure sensor disposed in the evaporative emissions system reaches a threshold pressure.

17. The method of claim 15, further comprising in response to the output of the humidity sensor changing at least by the threshold amount, adjusting exhaust gas recirculation during a subsequent engine operation based on the output of the humidity sensor.

18. A method, comprising:

during an engine-off condition, responsive to a fuel vapor canister load less than a threshold and an engine coolant temperature within a threshold temperature range of an engine intake air temperature:

isolating a fuel vapor canister from a fuel tank;

coupling the fuel vapor canister to atmosphere via an evaporative leak check module vacuum pump;

activating the evaporative leak check module vacuum pump in a conformation to pump atmospheric air into the fuel vapor canister;

opening a canister purge valve;

opening an air intake throttle; and indicating degradation of a MAF sensor disposed in an intake manifold in response to an output of the MAF sensor being outside of a threshold range.

19. The method of claim 18, further comprising:

indicating functionality of the MAF sensor responsive to the output of the MAF sensor being within the threshold range; and updating one or more evaporative emissions system testing schedules.

20. The method of claim 18, further comprising:

adjusting one or more engine operating parameters based on an estimated mass air flow during a next engine operation responsive to an indication of degradation of the MAF sensor, the estimated mass air flow based on an intake manifold pressure, a throttle position, and an engine speed;

wherein the threshold flow range is based on a commanded operating flow rate of the pump; and wherein an amount of opening of the canister purge valve is based on a diameter of a reference orifice within the evaporative leak check module.

* * * * *